(12) United States Patent
Poletto et al.

(10) Patent No.: US 10,120,528 B2
(45) Date of Patent: Nov. 6, 2018

(54) SYSTEMS AND METHODS FOR FORMING SHARE BARS INCLUDING COLLECTIONS OF CONTENT ITEMS

(71) Applicant: Dropbox, Inc., San Francisco, CA (US)

(72) Inventors: Stephen Poletto, San Francisco, CA (US); Yi Wei, San Francisco, CA (US); Joshua Puckett, Mountain View, CA (US); Andrew Scheff, San Francisco, CA (US); Abhay Buch, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 14/247,762

(22) Filed: Apr. 8, 2014

(65) Prior Publication Data

US 2015/0177922 A1 Jun. 25, 2015

Related U.S. Application Data

(60) Provisional application No. 61/920,719, filed on Dec. 24, 2013, provisional application No. 61/945,804, filed on Feb. 27, 2014.

(51) Int. Cl.
*G06F 3/0482* (2013.01)
*G06F 3/0481* (2013.01)
(Continued)

(52) U.S. Cl.
CPC .......... *G06F 3/0482* (2013.01); *G06F 3/0488* (2013.01); *G06F 3/04817* (2013.01);
(Continued)

(58) Field of Classification Search
CPC ........... H04N 21/2743; H04N 21/4223; H04N 21/4782; H04N 21/858; G06F 17/30274;
(Continued)

(56) References Cited

U.S. PATENT DOCUMENTS 6,983,424 B1 1/2006 Dutta
7,432,920 B2 10/2008 Schick et al.
(Continued)

OTHER PUBLICATIONS

Bergmann, Francine B.; Manssour, Isabel H.; Silveira, Milene S.; De Oliveira, João Batista S.; "Automatic layout generation for digital photo albums: A user study", Lecture Notes in Computer Science, v 8006 LNCS, n Part 3, p. 117-126, 2013; 15th International Conference on Human-Computer Interaction, HCI International 2013, Jul. 21, 2013-Jul. 26, 2013.
(Continued)

*Primary Examiner* — Sang H Kim
(74) *Attorney, Agent, or Firm* — Keller Jolley Preece

(57) ABSTRACT

Embodiments are provided for forming share bars including collections of content items. In some embodiments, a user interface may be displayed on a display interface of a user device. The user interface may include a first region including a collection of content items and a second region. A first gesture may be detected with the display interface that selects a first content item from the displayed collection of content items. In response to detecting the first gesture, a first thumbnail of the first content item may be created and placed in the second region. A share option may be provided within the second region that may enable a user of the user device to share any content items that may have a corresponding thumbnail in the second region.

18 Claims, 12 Drawing Sheets

(51) Int. Cl.
*G06F 3/0488* (2013.01)
*H04L 29/06* (2006.01)
*G06F 3/0484* (2013.01)

(52) U.S. Cl.
CPC ...... *G06F 3/04842* (2013.01); *G06F 3/04883* (2013.01); *H04L 65/403* (2013.01)

(58) Field of Classification Search
CPC .. G06F 3/0481; G06F 17/30843; G06F 3/048; G06F 3/041; G06F 7/00; H04L 21/58; H04W 88/02
USPC ......... 382/306; 386/241, 240; 715/206, 202, 715/204, 739
See application file for complete search history.

(56) References Cited

U.S. PATENT DOCUMENTS

| | | | |
|---|---|---|---|
| 7,562,311 | B2 | 7/2009 | Schiller |
| 7,706,637 | B2 | 4/2010 | Marriott |
| 7,843,581 | B2 | 11/2010 | Hill et al. |
| 8,013,874 | B2 | 9/2011 | Reid et al. |
| 8,106,856 | B2 | 1/2012 | Matas et al. |
| 8,385,952 | B2 | 2/2013 | Friedman |
| 8,413,076 | B2 | 4/2013 | Ishizawa |
| 8,713,448 | B2 | 4/2014 | Hirako |
| 2003/0182326 | A1* | 9/2003 | Patterson ............. 707/204 |
| 2004/0143598 | A1 | 7/2004 | Drucker |
| 2005/0192924 | A1* | 9/2005 | Drucker ............ G06F 3/0483 |
| 2005/0243381 | A1* | 11/2005 | Hill et al. ............. 358/453 |
| 2006/0109517 | A1 | 5/2006 | Catalan |
| 2006/0146765 | A1* | 7/2006 | Van De Sluis ........ G06F 3/016 370/338 |
| 2007/0024722 | A1 | 2/2007 | Eura et al. |
| 2007/0097430 | A1* | 5/2007 | Kitamaru et al. ......... 358/1.15 |
| 2007/0234226 | A1 | 10/2007 | Szeto |
| 2008/0195961 | A1 | 8/2008 | Bae et al. |
| 2009/0002335 | A1 | 1/2009 | Chaudhri |
| 2009/0094531 | A1 | 4/2009 | Danieli et al. |
| 2009/0113336 | A1 | 4/2009 | Reifman |
| 2011/0064319 | A1 | 3/2011 | Momosaki |
| 2011/0072344 | A1 | 3/2011 | Harris et al. |
| 2011/0083111 | A1* | 4/2011 | Forutanpour ........... H04W 4/21 715/863 |
| 2011/0209057 | A1* | 8/2011 | Hinckley ............. G06F 1/1641 715/702 |
| 2011/0219312 | A1 | 9/2011 | Kim et al. |
| 2012/0066630 | A1 | 3/2012 | Kim et al. |
| 2012/0179976 | A1 | 7/2012 | Lee et al. |
| 2012/0198386 | A1* | 8/2012 | Hautala ................ G06F 3/0481 715/838 |
| 2012/0331108 | A1 | 12/2012 | Ferdowsi et al. |
| 2013/0036363 | A1* | 2/2013 | Johnson ............. G06F 21/6245 715/738 |
| 2013/0072263 | A1 | 3/2013 | Kim |
| 2013/0080954 | A1 | 3/2013 | Carlhian et al. |
| 2013/0167055 | A1* | 6/2013 | Penev .................. G06F 3/0482 715/765 |
| 2013/0225236 | A1* | 8/2013 | Lee .................. G06F 17/30265 455/556.1 |
| 2013/0238990 | A1 | 9/2013 | Ubillos et al. |
| 2013/0332856 | A1* | 12/2013 | Sanders et al. ............. 715/753 |
| 2014/0040762 | A1 | 2/2014 | Kuscher et al. |
| 2014/0071323 | A1 | 3/2014 | Yi et al. |
| 2014/0146212 | A1 | 5/2014 | Jung et al. |
| 2014/0157169 | A1* | 6/2014 | Kikin-Gil ..................... 715/770 |
| 2014/0191986 | A1* | 7/2014 | Kim et al. ..................... 345/173 |

OTHER PUBLICATIONS

U.S. Appl. No. 14/247,768, filed Apr. 8, 2014, Yi.
U.S. Appl. No. 14/247,768, filed Jul. 3, 2014, Office Action.
International Search Report dated Nov. 4, 2014, as received in International Application No. PCT/US2014/049120, 11 pgs.
U.S. Appl. No. 14/247,768, Jul. 3, 2014, Office Action.
U.S. Appl. No. 14/247,768, Feb. 3, 2015, Office Action.
U.S. Appl. No. 14/247,768, Oct. 9, 2015, Office Action.

* cited by examiner

SYSTEMS AND METHODS FOR FORMING SHARE BARS INCLUDING COLLECTIONS OF CONTENT ITEMS

CROSS-REFERENCE TO RELATED PROVISIONAL APPLICATION

This application claims the benefit of U.S. Provisional Patent Application No. 61/920,719, filed Dec. 24, 2013, entitled "SYSTEMS AND METHODS FOR DISPLAYING AN IMAGE CAPTURING MODE AND A CONTENT VIEWING MODE, AND FOR FORMING SHARE BARS INCLUDING COLLECTIONS OF CONTENT ITEMS," and U.S. Provisional Patent Application No. 61/945,804, filed Feb. 27, 2014, entitled "SYSTEMS AND METHODS FOR FORMING SHARE BARS INCLUDING COLLECTIONS OF CONTENT ITEMS," both of which are incorporated herein by reference in their entirety.

FIELD OF THE INVENTION

Various embodiments also generally relate to forming one or more share bars including content items and/or collections of content items.

BACKGROUND

Now more than ever before, people are using user devices (e.g., smartphones, tablets, etc.) as a means for listening to music, taking photographs and videos, and sharing content with friends and social media networks. Although cameras and other components of user devices, are improving exponentially, their overall functions have largely remained unchanged. Thus, current applications often require a user to switch between a content viewing mode and an image or content capturing mode. For example, although a user device may include a high quality camera, a user still may have to exit the camera mode in order to view photos taken by the camera or stored on the user device. This may be cumbersome, as it may be much easier for a user to be able to view both the content viewing mode and the image capturing mode simultaneously without the need to exit one mode and switch to the other.

Furthermore, it can be difficult for a user to quickly and efficiently organize content items into a collection and perform an action on the collection. For example, a user may want to share photographs from a photo album. However, it may be difficult for the user to recall all the images selected to be shared once they are ready to perform a share. Thus, it would be useful for a user to not only easily create collections of content items for sharing, but to also view the content items included within the collections and/or perform one or more actions on the collections jointly within a stand-alone application.

SUMMARY

Systems, methods, and non-transitory computer readable mediums for forming share bars to share content items are also provided. Such systems may include one or more processors, one or more image capturing components, a display interface, and memory containing instructions.

Such methods may include displaying a user interface on a user device. For example, the user device may include a display interface capable of displaying the user interface thereon. The user interface may include a first region including a collection of content items and a second region. Various types of collections of content items may include, but are not limited to, photo albums, movies, slideshows, presentations, and/or playlists. In some embodiments, a first gesture may be detected with the displaying interface that selects a first content item from the collection of content items and, in response, creates a first thumbnail of a first content item that is placed in the second region of the user interface. In some embodiments, a share option may be provided within the second region of the user interface. The share option may enable a user of the user device to share content items that have corresponding thumbnails within the second region. In some embodiments, the content items may be shared with one or more contacts associated with the user of the user device, one or more social media networks, and/or a content management system with which the user may have an authorized account.

In some embodiments, the second region may include one or more share bars. Content items selected via detection of a first touch gesture may be placed in one or more of the share bars included within the second region of the user interface. In some embodiments, multiple share options may be provided. The share options may enable the user to share one or more of the content items having a corresponding thumbnail within a share bar with one or more contacts, one or more social media networks, and/or a content management system.

Such method may also include displaying a user interface including a first content item from a collection of content items on a display interface of a user device. A touch gesture may be detected with the display interface. The touch gesture may automatically place the first content item in a share bar and/or delete the first content item from the collection of content items. In some embodiments, in response to detecting the touch gesture, a second content item from the collection of content items may be displayed on the user interface. The second content item may be the next content item, sequentially, from within the collection of content items. For example, the second content item may be a second slide from a presentation after a first slide.

BRIEF DESCRIPTION OF THE DRAWINGS

The above and other aspects and advantages of the invention will become more apparent upon consideration of the following detailed description, taken in conjunction with accompanying drawings, in which like referenced characters refer to like parts throughout, and in which.

DETAILED DESCRIPTION OF THE DISCLOSURE

Methods, systems, and computer readable mediums for forming share bars including collections of content items are provided. Share bars may allow users to quickly and efficiently share one or more content items with one or more contacts, one or more social media networks, and/or a content management system with which a user may have an authorized account.

It is noted that the terms "device" and "content management system" are used herein to refer broadly to a wide variety of storage providers and data management service providers, electronic devices and user devices. It is also noted that the term "content item" is user herein to refer broadly to a wide variety of digital data, documents, text content items, audio content items, video content items, portions of content items, and/or other types of data. Content items may also include files, folders or other mechanisms of grouping content items together with different behaviors, such as collections of content items, playlists, albums, etc. The term "user" is also used herein broadly, and may correspond to a single user, multiple users, authorized accounts, an application or program operating automatically on behalf of, or at the behest of a person, or any other user type, or any combination thereof. The term "gesture" and "gestures" are also used herein broadly, and may correspond to one or more motions, movements, hoverings, inferences, signs, or any other such physical interactions with one or more sensors, or any combination thereof, including vocal commands or interpretations of eye movements based on retinal tracking. The term "continuous real-time image" is also used herein broadly, and may correspond to live images captured via one or more image capturing components, continuous images captured, recorded images, or any other type of image that may be captured via an image capturing component, or any combination thereof.

The present invention may take form in various components and arrangements of components, and in various techniques, methods, or procedures and arrangements of steps. The referenced drawings are only for the purpose of illustrating embodiments, and are not to be construed as limiting the present invention. Various inventive features are described below that can each be used independently of one another or in combination with other features.

Figure 1:
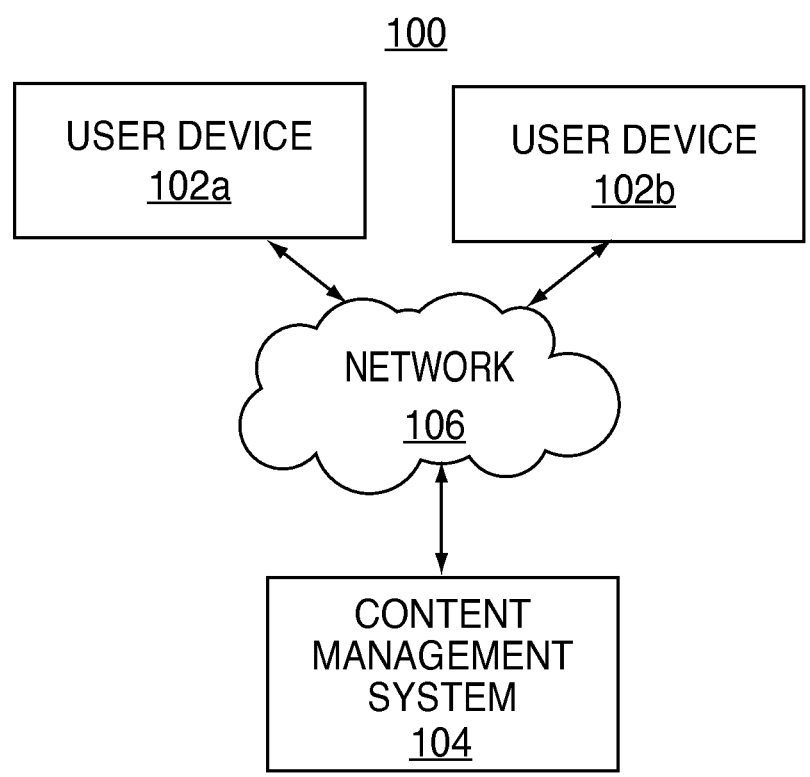
FIG. 1 shows an exemplary system in accordance with various embodiments.

FIG. 1 shows an exemplary system in accordance with various embodiments. System 100 may include user devices 102a and 102b, which may communicate with content management system 104 across network 106. Persons of ordinary skill in the art will recognize that although only two user devices are shown within system 100, any number of user devices may interact with content management system 104 and/or network 106, and the aforementioned illustration is merely exemplary.

Network 106 may support any number of protocols, including, but not limited to, Transfer Control Protocol and Internet Protocol ("TCP/IP"), Hypertext Transfer Protocol ("HTTP"), and/or wireless application protocol ("WAP"). For example, user device 102a and user device 102b (collectively 102) may communicate with content management system 104 using TCP/IP, and, at a higher level, use a web browser to communicate with a web server at content management system 104 using HTTP.

A variety of user devices 102 may communicate with content management system 104, including, but not limited to, desktop computers, mobile computers, mobile communication devices (e.g., mobile phones, smart phones, tablets), televisions, set-top boxes, and/or any other network enabled device. Various types of user devices may include, but are not limited to, smart phones, mobile phones, tablet computers, personal digital assistants (PDAs), laptop computers, digital music players, and/or any other type of user device capable of including a touch-sensing display interface. Various touch-sensing display interfaces may include, but are not limited to, liquid crystal displays (LCD), monochrome displays, color graphics adapter (CGA) displays, enhanced graphics adapter (EGA) displays, variable-graphics array (VGA) displays, or any other display, or any combination thereof. In some embodiments, the touch-sensing display interface may include a multi-touch panel coupled to one or more processors to receive and detect gestures. Multi-touch panels, for example, may include capacitive sensing mediums having a one or more of row traces and/or driving line traces, and one or more column traces and/or sensing lines. Although multi-touch panels are described herein as one example for touch-sensing display interface, persons of ordinary skill in the art will recognize that any touch-sensing display interface may be used. Furthermore, various types of user devices may, in some embodiments, include one or more image capturing components. For example, user devices 102 may include a front-facing camera and/or a rear facing camera.

Content management system 100 may allow a user with an authenticated account to store content, as well as perform management tasks, such as retrieve, modify, browse, synchronize, and/or share content with other accounts. In some embodiments, a counter-part user interface (e.g., stand-alone application, client application, etc.) on user devices 102 may be implemented using a content management interface module to allow a user to perform functions offered by modules of content management system 104. A more detailed description of system 100 is presented below, with reference to FIG. 12.

Figure 2A:
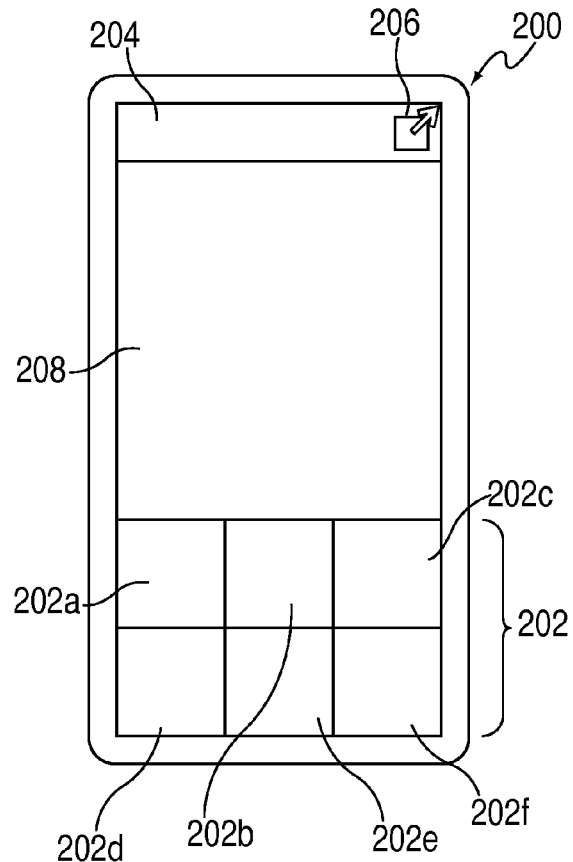
FIG. 2A shows a schematic illustration of user interfaces displaying a collection of content items and a share bar in accordance with various embodiments.

FIG. 2A shows a schematic illustration of user interfaces displaying a collection of content items and a share bar in accordance with various embodiments. User interface 200 may be displayed on a display interface of a user device, such as first and/or second user devices 102 of FIG. 1. The display interface may allow a user of the user device to interact with user interface 200.

User interface 200 may include first region 202 and second region 204. In some embodiments, first region 202 may include a collection of content items, such as content items 202a-202f. In some embodiments, the content items may be stored within storage on the user device. In some embodiments, the content items may be obtained via one or more social media networks and/or content management systems. For example, the user may pull one or more content items from their social media network profile, and the pulled content item(s) may be displayed within the first region. Any number of content items may be included within first region 202, and the content items may be positioned at any location on user interface 200. For example, first region 202 may divide the user interface horizontally, vertically, diagonally, or any in any other suitable manner. First region 202 may occupy any amount of user interface 200. For example, first region 202 may occupy a lower half of user interface 200 (e.g., approximately 50% of the corresponding display interface).

In some embodiments, second region 204 may include a share bar that may include one or more content items that may have been or may be shared. A user may select and place, via one or more gestures, one or more content items from the collection of content items included within first region 202 into second region 204, allowing the user to share the selected content items. In some embodiments, the share bar may include thumbnails corresponding to content items from the collection of content items. Second region 204 may occupy any amount of the display and may be positioned at any location on user interface 200. For example, second region 204 may be a horizontal bar located in an upper portion of user interface 200.

In some embodiments, second region 204 may include button 206. In some embodiments, button 206 may be a physical button that may be depressed by a user. In some embodiments, button 206 may be a virtual button included within user interface 200 and may be pushed or activated via one or more gestures performed by the user on user interface 200. Activation of button 206 may invoke any number of functions to be performed on the content items, or thumbnails corresponding to content items, included within second region 204. In some embodiments, button 206 may be a share button and pushing button 206 may allow the user to share the contents of the share bar with one or more contacts, one or more social media networks, a content management system (e.g., content management system 100), or any other application, or any combination thereof. For example, the user may tap button 206, which may allow the user to upload the contents of the share bar to a content management system with which the user has an authorized account. In some embodiments, activation of button 206 may present multiple sharing options to the user. For example, taping button 206 may present the user with a listing of one or more social media networks, one or more messaging options (e.g., SMS messages, MMS messages, e-mail messages, etc.), and/or a content management system with which the user may use to share.

In some embodiments, user interface 200 may include third region 208. Third region 208 may be located at any position and may occupy any amount of display space on user interface 200. For example, third region 208 may be located between first region 202 and second region 204. As another example, third region 208 may occupy an upper portion of the display interface displaying user interface 200, while first region 202 and second region 204 may both occupy a lower portion. However, this is merely exemplary and any orientation, partitioning scheme, and occupancy may be implemented, and the use of one layout of user interface 200 does not preclude the use of any other layout. In some embodiments, the user may move first, second, and third regions 202, 204, and 206 about the user interface to any position and/or change the sizes of each region as the user desires. In some embodiments, one or more regions may be omitted and/or one or more additional regions may be added.

In some embodiments, third region 208 may include continuous real-time images captured via one or more image capturing components resident on the user device. For example, user devices 102 of FIG. 1 may include one or more cameras, and the images captured by cameras may be displayed within third region 208 on user interface 200. In some embodiments, third region 208 may display one or more content items stored on the user device, a content management system, and/or one or more social media networks. For example, the user may have an image (e.g., a photograph) stored in memory on user devices 102, and third region 208 may display the stored image. As another example, the user may be playing a music item on their device and the cover art and/or information corresponding to the music item (e.g., song title, album title, etc.) may be displayed within third region 208.

Figure 2B:
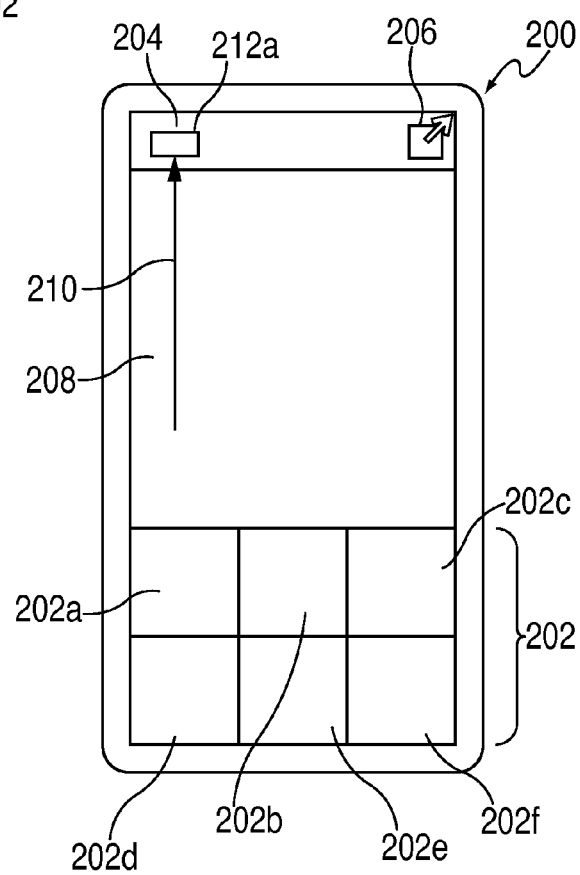
FIG. 2B shows a schematic illustration of user interfaces displaying a collection of content items and a share bar including a thumbnail corresponding to a content item in accordance with various embodiments.

FIG. 2B shows a schematic illustration of user interfaces displaying a collection of content items and a share bar including a thumbnail corresponding to a content item in accordance with various embodiments. In some embodiments, first region 202, second region 204, third region 208, button 206, and content items 202a-202f of FIG. 2B may be substantially similar to first region 202, second region 204, third region 208, button 206, and content items 202a-202f of FIG. 2A, and the previous description of the latter may apply to the former.

In some embodiments, a user may perform one or more gestures that may select one or more content items and place the selected content item(s) in second region 204. For example, a user may drag content item 202a to the share bar located in second region 204. Line 210 may correspond to the path of content item 202a as the user performs the gesture on user interface 200. For example, the user may drag content item 202a from first region 202 to second region 204, and the path that the content item takes may be represented by line 210.

In some embodiments, once the content item has been dragged into the second region (e.g., the share bar), a thumbnail corresponding to the content item may be displayed therein. For example, thumbnail 212a may correspond to content item 202a, which may have been dragged from first region 202 to second region 204. Thumbnail 212a may be any reduced size version corresponding to content item 202a. For example, thumbnail 212a may be a reduced sized version of content item 202a, an exemplary image corresponding to content item 202a, a portion of content item 202a, a pointer directed to content item 202a, a lower resolution copy of content item 202a, or any other type of thumbnail, or any other combination thereof. In some embodiments, a cache memory specific for thumbnail images may be used.

Figure 2C:
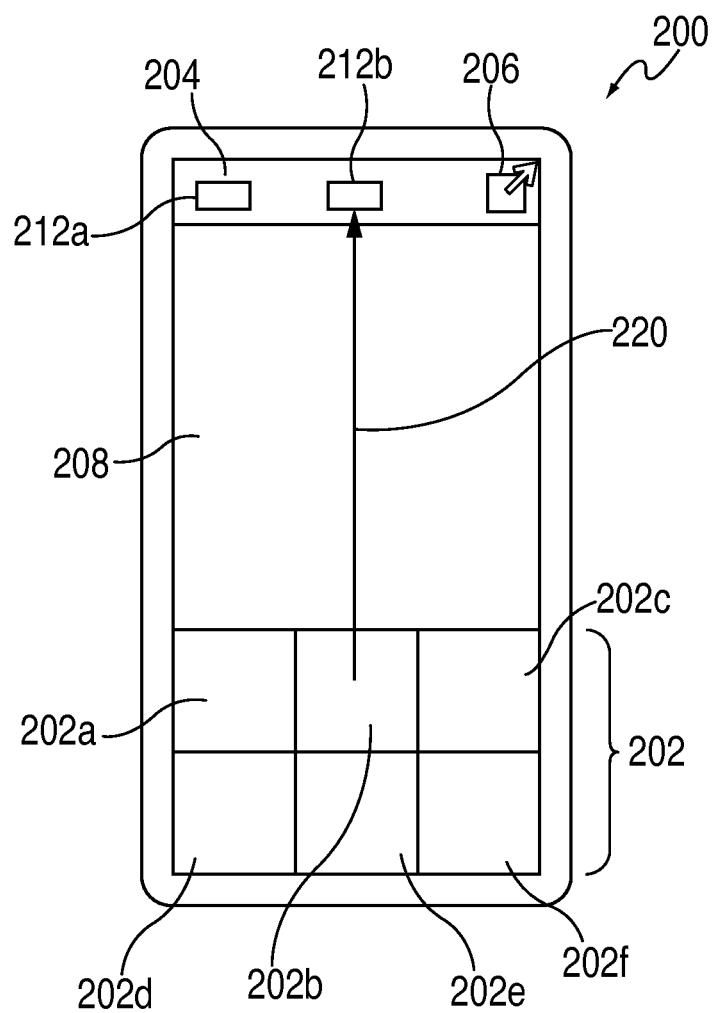
FIG. 2C shows a schematic illustration of user interfaces displaying a collection of content items and a share bar including multiple thumbnails corresponding to multiple content items in accordance with various embodiments.

FIG. 2C shows a schematic illustration of a user interface displaying a collection of content items and a share bar including multiple thumbnails corresponding to multiple content items in accordance with various embodiments. FIG. 2C includes user interface 200 which may be substantially similar to user interface 200 of FIG. 2B, and the previous description of the latter may apply to the former. As previously mentioned, a user may perform one or more gestures to select and place one or more content items included within first region 202 into second region 204. For example, the user may drag content item 202b to the share bar located in second region 204. In some embodiments, line 220 may represent the path of the drag performed by the user.

As previously mentioned, once a content item has been placed in the second region, a corresponding thumbnail may be displayed within second region 204 (e.g., the share bar). In some embodiments, each content item placed in second region 204 may have a corresponding thumbnail displayed therein. For example, content item 202b may be placed in the share bar within second region 204, and in response to the placement, thumbnail 212b may be displayed therein. In some embodiments, the various thumbnails may be displayed in chronological order. For example, content item 202a may have been selected and placed in the share bar prior to content item 202b. In this scenario, thumbnail 212a may be displayed within the share bar before thumbnail 212b. This however, is merely exemplary, and any ordering of the thumbnails may be used. In some embodiments, the ordering of the thumbnail may be dynamic, and the user may be able to place the thumbnails in any order. For example, as the user places content item 202b into second region 204, thumbnail 212b may be created and the user may place thumbnail 212b in a first position to the left of thumbnail 212a. This may cause thumbnail 212a (and any other thumbnail included within the share bar) to be moved a position to the right.

In some embodiments, content items 202a-202f may be stored in memory on the user device. Upon selection of one or more content items by the user to be placed in the share bar, a duplicate version of the one or more content items may be created and temporarily stored in cache memory on the user's user device. This may allow the original content item to remain in its originally stored location while the duplicate may be moved about user interface 200. In some embodiments, as the selected content item or items are placed within the share bar, a thumbnail or thumbnails corresponding to the select content item or items may be created. In some embodiments, the thumbnail created may be a compressed version of the original content item and/or the duplicate content item. This may allow a smaller amount of storage space to be required to store the thumbnail within the share bar, as storing two content items in their original format may occupy more space than storing compressed versions. In some embodiments, the thumbnail may be a pointer that may "point" to the content item. When and/or if an action is performed on the thumbnail, the pointer may direct the action to the original content item. This may be beneficial because less memory may be required to store a pointer to a content item then to store duplicate versions of content items.

In some embodiments, as the user places the content item stored on the user device into the share bar, a duplicate version of the content item may be created and automatically uploaded to a content management system. For example, content item 202a may be placed in the share bar and, upon placement, a duplicate version of content item 202a may be created and uploaded to content management system 100. Thumbnail 212a may then correspond to the duplicate version of content item 202a, which may now be stored on the content management system.

In some embodiments, user interface 200 may correspond to a dedicated application residing on a user device (e.g., a content management application located on user devices 102 of FIG. 1). In some embodiments, the dedicated application may be linked to an external device such as a server, or an external service such as a social media network, and/or a content management system (e.g., content management system 100). Content items included within user interface 200 may be stored remotely on the external device and/or the external service. For example, the user may upload one or more content items to content management system 100 via network 106, which may then be displayed within user interface 200. In some embodiments, as the user performs gestures to select and place one or more content items into the share bar, pointers may be created that may direct the thumbnail to the corresponding content item. For example, thumbnail 212a may be a pointer pointing to content item 202a stored within a file hierarchy on the user's account on content management system 100.

Figure 3A:
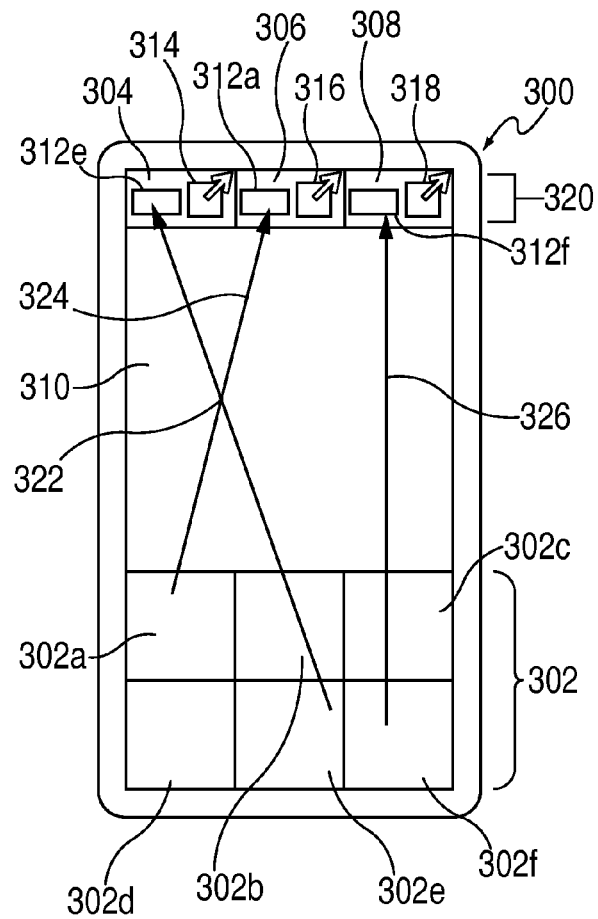
FIG. 3A shows a schematic illustration of user interfaces displaying a collection of content items and multiple share bars each including one or more corresponding thumbnails in accordance with various embodiments.

FIG. 3A shows a schematic illustration of a user interface displaying a collection of content items and multiple share bars each including one or more corresponding thumbnails in accordance with various embodiments. User interface 300 may include first region 302 and second region 320. First region 302 may include contact items 302a-f. Although only six content items shown within first region 302, persons of ordinary skill in the art will recognize that any number of content items may be included, and the use of six is merely exemplary. In some embodiments, the user may select the content items displayed within the first region. For example, the user may select content items from items stored on the user device and/or stored on one or more social media networks and/or a content management system. In some embodiments, the software running user interface 300 may randomly select the content items to be displayed therein. First region 302 may be located at any position and occupy any amount of display space on user interface 300. For example, first region 302 may occupy a lower portion of a display interface displaying user interface 300. In some embodiments, user interface 300 may include third region 310 which may be substantially similar to third region 208 of FIG. 2, and the previous description of the latter may be applied to the former.

In some embodiments, second region 320 may include one or more share bars. Second region 320 of FIG. 3A may be substantially similar to second region 204 of FIG. 2 with the exception that second region 320 may include multiple share bars. In some embodiments, second region 320 may include share bars 304, 306, and 308. Share bars 304, 306, and 308 may each be able to share content items that have been placed therein with one or more contacts associated with the user of the user device, one or more social media networks, and/or a content management system. In some embodiments, share bars 304, 306, and 308 may be substantially similar to one another with the exception that each share bar may be shared differently and/or include different content items. For example, share bar 304 may include content items to be shared with a friend, whereas share bars 306 and 308 may include content items to be shared with one or more family members.

Each share bar may include a sharing button, such as buttons 314, 316, and 318 corresponding to share bars 304, 306, and 308, respectively. In some embodiments, each of buttons 314, 316, and 318 of FIG. 3 may be substantially similar to button 206 of FIG. 2, and the previous description of the latter may apply to the former. In some embodiments, one or more of buttons 314, 316, and 318 may not be included within a particular share bar. In some embodiments, no share bar may include its own button, and one or more share buttons may be located outside of second region 320 allowing any of the share bars included therein to be shared either on its own or in combination with another share bar or bars.

In some embodiments, the user may perform one or more gestures on the user interface 300 that may select and place one or more content items included within first region 302 into one or more share bars included within second region 320. For example, the user may perform a drag gesture to content item 302a, moving it into share bar 306. Upon placing content item 302a into share bar 306, thumbnail 312a may be created within share bar 306 corresponding to content item 302. In some embodiments, thumbnail 312a of FIG. 3 may be substantially similar to thumbnail 212a of FIG. 2, and the previous description of the latter may apply to the former. The path of the gesture performed by the user to place content item 302a into share bar 306 may be represented by line 322. In some embodiments, line 322 may be displayed on user interface 300 enabling the user to visualize the gesture being performed. In some embodiments, line 322 may be virtual. The user may similarly perform one or more additional gestures placing one or more additional content items into any of the share bars. For example, the user may perform a drag gesture to content item 302e placing it within share bar 304 and creating thumbnail 312e. Line 322 may represent the path of content item 302e from the first region to the second region and may be substantially similar to line 322. Furthermore, the user may also perform a drag gesture that may place content item 302f into share bar 308 by dragging content item 302f along line 326. Thumbnail 312f may correspond to content item 302f which now may be placed within share bar 304.

Figure 3B:
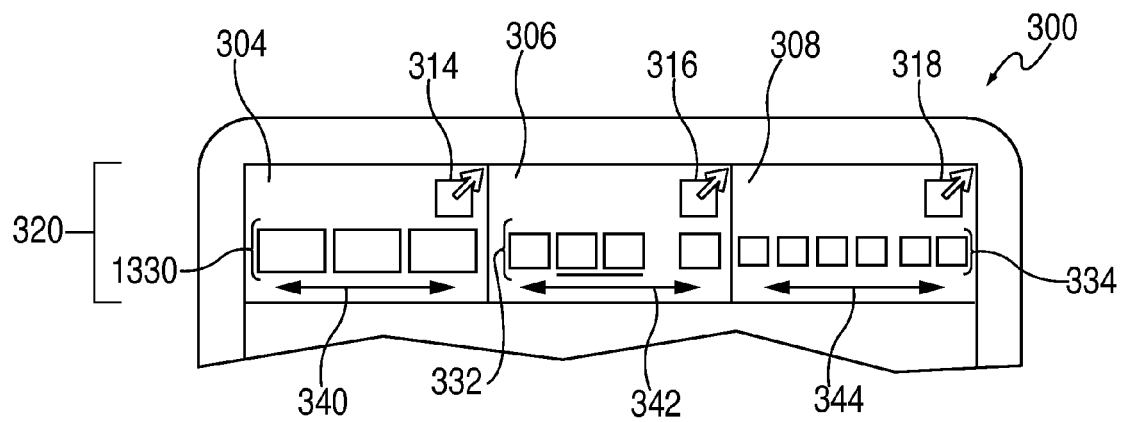
FIG. 3B shows a schematic illustration of a zoomed-in user interfaces displaying a collection of content items and multiple share bars each including one or more corresponding thumbnails in accordance with various embodiments.

FIG. 3B shows a schematic illustrations of a zoomed-in user interface displaying a collection of content items and multiple share bars each including one or more corresponding thumbnails in accordance with various embodiments. User interface 300 of FIG. 3B may be a zoomed-in view of an upper portion of user interface 300 of FIG. 3A, and the previous description of that latter may apply to the former. As previously mentioned, in some embodiments, second region 320 of user interface 300 may include share bars 304, 306, and 308. The user may select content items from within various collections of content items and place one or more of the selected content items into one or more various share bars.

As the user places a content item into a share bar, a thumbnail corresponding to the content item may be created within the share bar. In some embodiments, each content item may have a corresponding thumbnail included within the share bar. For example, share bar 304 may include thumbnails 330, share bar 306 may include thumbnails 332, and share bar 308 may include thumbnails 334. Each share bar may include any number of thumbnails corresponding to any type and any number of content items. Furthermore, each share bar may organize and display the thumbnails included therein in any suitable manner. For example, thumbnails may be displayed chronologically, by the type of content item, or using any other organization scheme, or any combination thereof.

In some embodiments, the user may scroll through the thumbnails included within each share bar. In some embodiments, the user may perform one or more gestures, such as a flick, a tap, a swipe, and/or a finger roll, to the share bar to scroll through the thumbnails. For example, the user may provide a finger swipe in the directions of arrow 340 to scroll through thumbnails 330 included within share bar 304. This way, the user may be able to check which content items would be included within the share bar if the user decided to share that particular share bar. In some embodiments, the user may select a thumbnail from one share bar and move it to another share bar. For example, thumbnail 312e of share bar 304 may be selected and moved to share bar 308. In some embodiments, moving the thumbnail may change a pointer of a content item associated with the thumbnail to now point to the new share bar. In some embodiments, the user may perform one or more gestures that may cause the share bar or bars to "pop-out". For example, when the share bar pops out, it may enlarge in size, change in its coloring, or be modified in any other suitable manner to increase that particular share bar's prominence. Thus, the user may now be able to scan the entire contents of the share bar.

In some embodiments, the user may select an entire share bar and place it within another share bar. For example, share bar 304 may correspond to pictures from a family vacation, and the user may decide that all of these pictures should be shared with the user's spouse, whose share bar may correspond to share bar 306. In some embodiments, one or more modules located on the user device displaying the user interface and/or on the external device displaying the user interface may determine if one or more thumbnails included within the share bars are duplicates and or near duplicates. For example, a user sharing pictures of a family vacation may have one or more pictures from the family vacation in one of the user's share bars, for example a share bar corresponding to the user's spouse. Thus to avoid redundancy, any image that substantially matches another image included within the share bars may be flagged so that the user can determine whether or not to keep and/or remove the thumbnail (and thus the content item) from the share bar.

Figure 4:
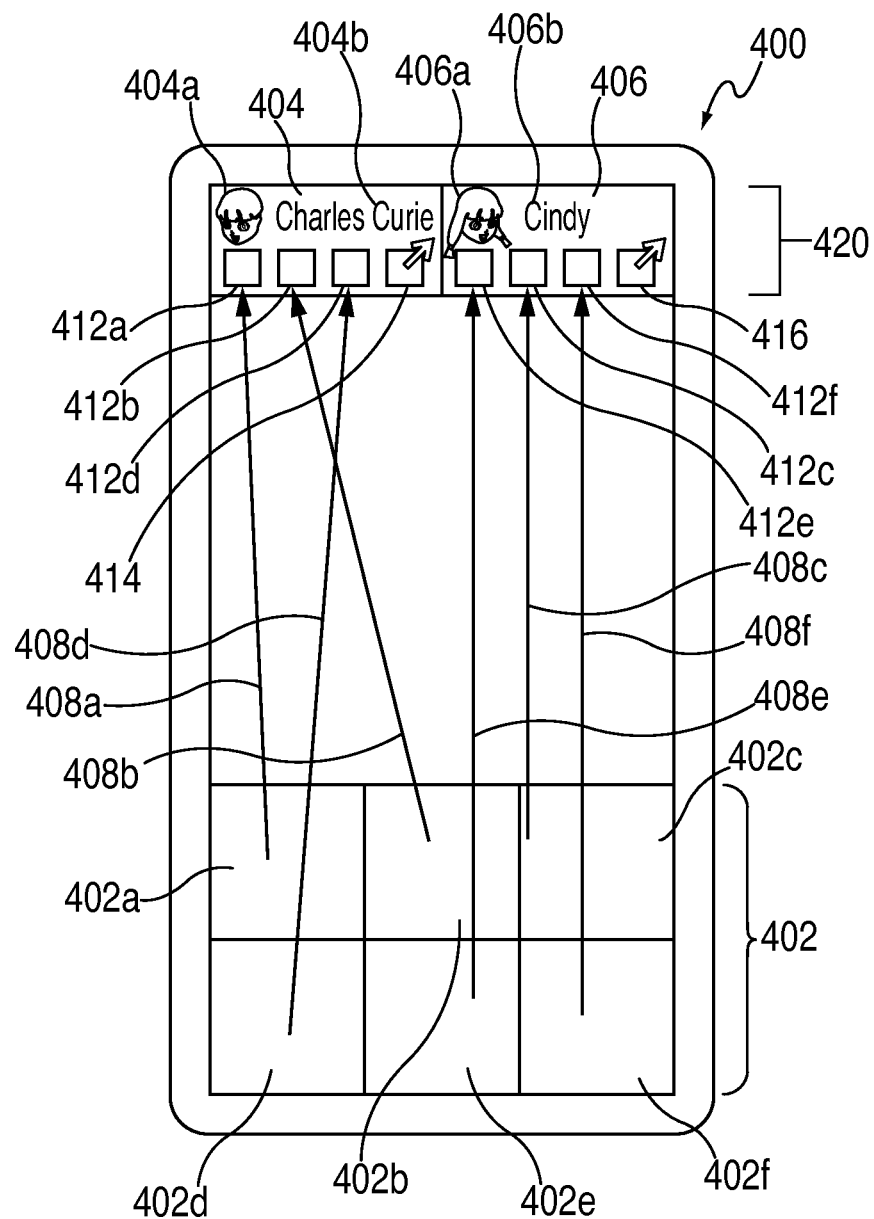
FIG. 4 shows a schematic illustration of a user interface displaying a collection of content items and multiple share bars corresponding to contacts of a user in accordance with various embodiments.

FIG. 4 shows a schematic illustration of a user interface displaying a collection of content items and multiple share bars corresponding to contacts of a user in accordance with various embodiments. User interface 400 may include first region 402, second region 404, and third region 412, each of which may be substantially similar to first region 202, second region 204, and third region 210 of FIG. 2, and the previous description of the latter may be applied to the former. First region 402 may include content items 402a-f which, in some embodiments, may be substantially similar to content items 202a-f of FIG. 2, and the previous description of the latter may also be applied to the former.

In some embodiments, second region 420 may include first share bar 404 and second share bar 406. In some embodiments, first share bar 404 and second share bar 406 may be substantially similar to share bars 302, 304, and 306, with the exception that first and second share bars 404 and 406 may correspond to one or more contacts of a user of the user device displaying user interface 400. For example, first share bar 404 may correspond to a first contact and second share bar 406 may correspond to a second contact. In some embodiments, share bars corresponding to a specific contact or contacts may be used to quickly and easily share content items with the that share bar's corresponding contact(s). This may eliminate the need to continually add contacts to a share bar. For example, if a user frequently shares content items with a specific contact (e.g., a spouse), a share bar dedicated to sharing with that contact may allow the user to quickly share content items with that contact, without the need of adding the contact to a share bar each time a share bar is formed. Although only two share bars corresponding to two contacts are displayed within user interface 400, persons of ordinary skill in the art will recognize that any number of share bars corresponding to any number of contacts may be included. For example, a share bar may correspond to one contact or multiple contacts.

In some embodiments, the share bar may include information corresponding to the contact or contacts associated with that share bar. For example, first share bar 404 may correspond to the first contact and may include first contact image 404a and first contact name 404b. First contact image 404a may be any image selected by the user for the first contact, assigned to the first contact by a content management system, and/or chosen by the first contact. First share bar 404 may also include button 414, which may be substantially similar to button 206 of FIG. 2 with the exception that button 414 may allow the user to share the content items included within share bar 404 directly with the first contact. In some embodiments, button 414 may also allow the user to share the content items included within share bar 404 with one or more additional contacts, one or more social media networks, and/or a content management system. Similarly, second share bar 406 may correspond to the second contact and may include second contact image 406a, second contact name 406b, and button 416. In some embodiments, one or more of content items 402a-f may be placed within one or more share bars included within second region 420 using one or more gestures.

Figure 5:
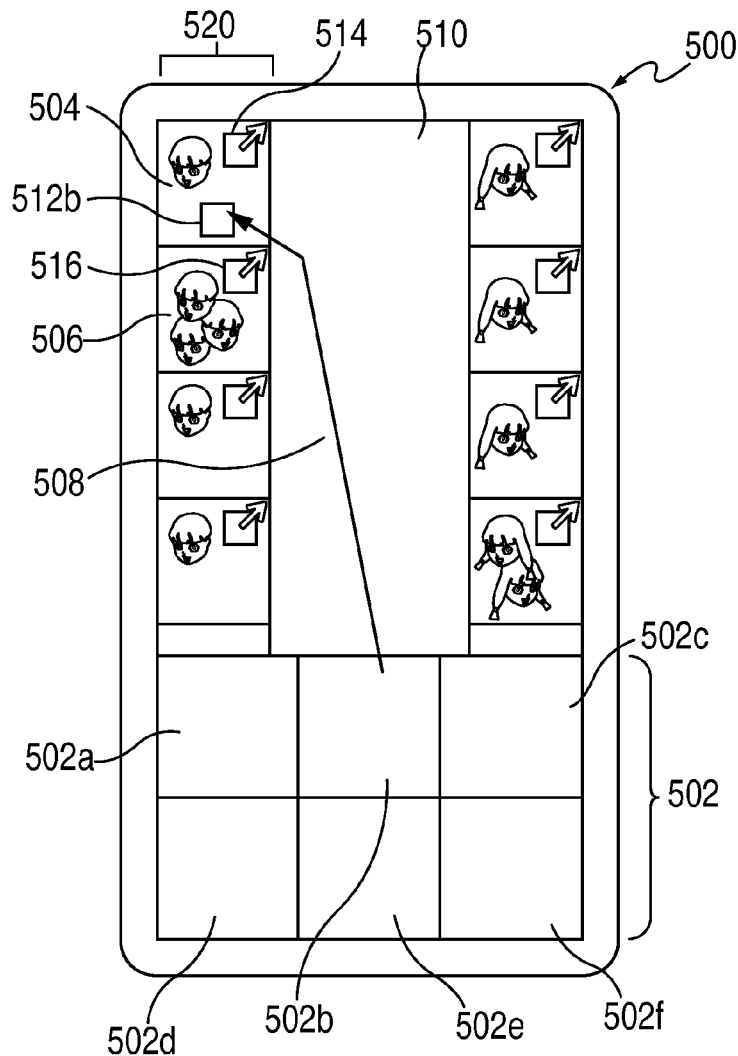
FIG. 5 shows another schematic illustration of a user interface displaying a collection of content items and multiple share bars corresponding to contacts of a user in accordance with various embodiments.

FIG. 5 shows another schematic illustration of a user interface displaying a collection of content items and multiple share bars corresponding to contacts of a user in accordance with various embodiments. User interface 500 may be substantially similar to user interface 200 of FIG. 2, with the exception that second region 520 may be located on one or both sides of user interface 500. In some embodiments, second region 520 and third region 510 may occupy an upper portion of the user interface, while first region 502 may occupy a lower portion of the user interface. In some embodiments, second region 520 may occupy a left upper portion and a right upper portion of the user interface, and may flank third region 510. This, however, is merely exemplary, and any orientation, sizing, and/or presentation of regions 502, 1520, and 510 may be used.

In some embodiments, second region 520 may not originally be displayed on user interface 500. Second region 520 may be "hidden" off to the sides of the user interface until a user provides an action causing second region 520 to "pop" out. For example, second region 520 may not be initially displayed on user interface 500, however in response to the user dragging content item 502b in the direction of line 508, second region 520 may "pop-up" from a side of user interface 500. In some embodiments, icons corresponding to share bars may be displayed on user interface 500, which may allow the user to place content items in certain share bars. For example, share bar 504 may not initially be displayed on user interface 500, however one or more icons corresponding to the share bar may be displayed on a side of user interface 500. Share bar 504 may, for example, correspond to a share bar for a user's contact, and an image of the contact may be displayed on the user interface. As the user drags a content item towards the image of the contact, second region 520, including share bar 504, may pop out and/or be displayed on the user interface. This may allow more display space to be available to the user because second region 520 may not be continually displayed. Similarly, in some embodiments, first region 502 may initially be "hidden", however in response to one or more gestures being detected with the display interface displaying user interface 500, first region 502 may be displayed.

In some embodiments, second region 520 may include share bars 504 and 506, which may be substantially similar to share bars 404 and 406 of FIG. 4, with the exception that share bars 504 and 506 may be displayed on a side of user interface 500. In some embodiments, one or more of share bars 504 and 506 may correspond to multiple contacts that the user may share content with. If the user selects and places a content item within share bar 506, that content item may be shared with each contact corresponding to share bar 506. In some embodiments, a content item placed within share bar 506 may not be shared with the corresponding contacts until the user presses button 516.

In some embodiments, share bars may continually be displayed within second region 520. For example, contacts that frequently have content items shared with them may have a separate share bar specific to that contact kept in second region 520 to allow the user to share content items with frequent sharees. In some embodiments, the second region 520 may not continually include any contact specific share bars, and new share bars for a specific contact may be created and/or added each time the user chooses to share items with the specific contact.

In some embodiments, placing a content item within a share bar may cause a URL link to be generated that may be sent to the one or more contacts associated with the share bar. For example, share bar 506 may be a share bar for the user's family, and any content item placed within share bar 506 may be shared with each member of the user's family via a URL link. The URL link may be delivered to the contacts using any suitable mode of communications including, but not limited to, MMS messages, SMS messages, instant messages, emails, or any other type of message. In some embodiments, in response to detecting that the user has either placed a content item within share bar 506 and/or invoked button 516, each contact member included within share bar 506 may automatically be sent a URL link to receive the shared content item.

Figure 6:
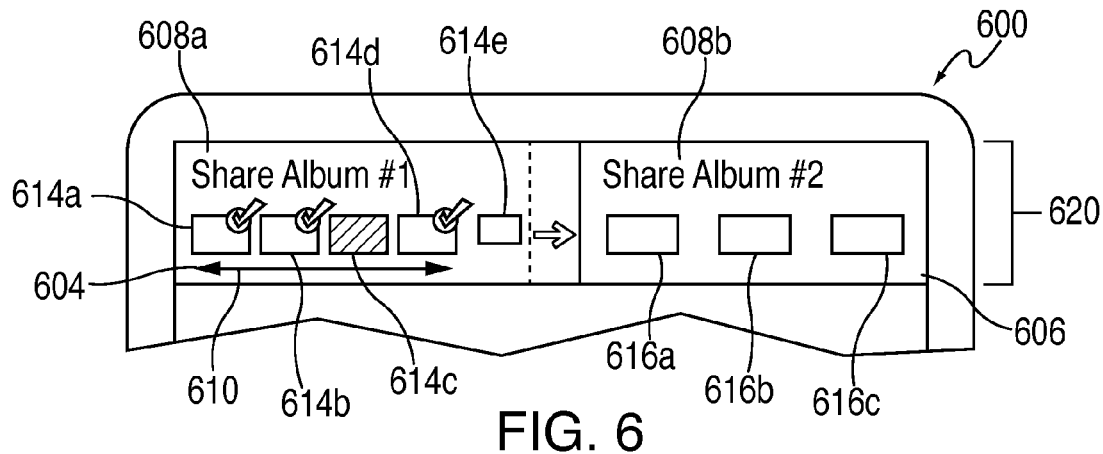
FIG. 6 shows a schematic illustration of a zoomed-in user interface displaying multiple share bars including thumbnails corresponding to content items that may be scrolled through in accordance with various embodiments.

FIG. 6 shows a schematic illustration of a zoomed-in user interface displaying multiple share bars including thumbnails corresponding to content items that may be scrolled through in accordance with various embodiments. User interface 600 may include region 620, which may be substantially similar to second region 420 of FIG. 4, and the previous description of the latter may apply to the former. Region 620 may include one or more share bars, such as first share bar 604 and second share bar 606. Although only two share bars are displayed within user interface 600, persons of ordinary skill in the art will recognize that any number of share bars may be included.

As previously mentioned, a user may select and place one or more content items into a share bar, at which point a thumbnail corresponding to the one or more content items may be created. For example, first share bar 604 may include thumbnail 614a-e, which may each correspond to a content item. Similarly, second share 606 may include thumbnail 616a-c. In some embodiments, the thumbnails may be scrollable to allow the user to view which content items may be included within each share bar. The user may provide one or more gestures, which may be detected with the display interface displaying user interface 600, to scroll through the thumbnail. For example, the user may swipe one or more fingers in the direction of dual-sided arrow 610 to scroll through first share bar 604.

In some embodiments, the user may determine that one or more thumbnails (and therefore one or more content items) may need to be removed from the share bar. For example, the user may decide that one or more content items having a corresponding thumbnail within first share bar 604 may not be suitable to be shared. The user may provide any appropriate gesture (e.g., a tap) to select a thumbnail corresponding to the thumbnail of the content item, and/or remove a thumbnail (and its corresponding content item) from the share bar. In some embodiments, the thumbnail may change its appearance in response to the gesture being performed. For example, the user may tap on content item 614a to remove it from first share bar 604. In response to detecting the tap, a check mark may appear on content item 614a indicating a potential action to be performed (e.g., removal from share bar 604). The removal of a thumbnail from a share bar is merely one example of an alteration that may occur to a thumbnail. In some embodiments, if it is determined that a thumbnail corresponding to a content item has already been shared, the content item may change in appearance. For example, thumbnail 614c may have already been shared, and thus may appear "grayed-out" to indicate to the user that it has previously been shared.

In some embodiments, first share bar 604 and second share bar 606 may include titles 608a and 608b, respectively. For example, share bar 604 may correspond to a first share album and second share bar 606 may correspond to a second share album. In some embodiments, one or more of the share bars may include an image, name, sharing history, and/or contact information corresponding contact that may receive the shared items. For example, first share bar 604 may be a share bar corresponding to the user's spouse, and share bar 604 may include the spouse's name, image, or contact information as title 608a.

Figure 7A:
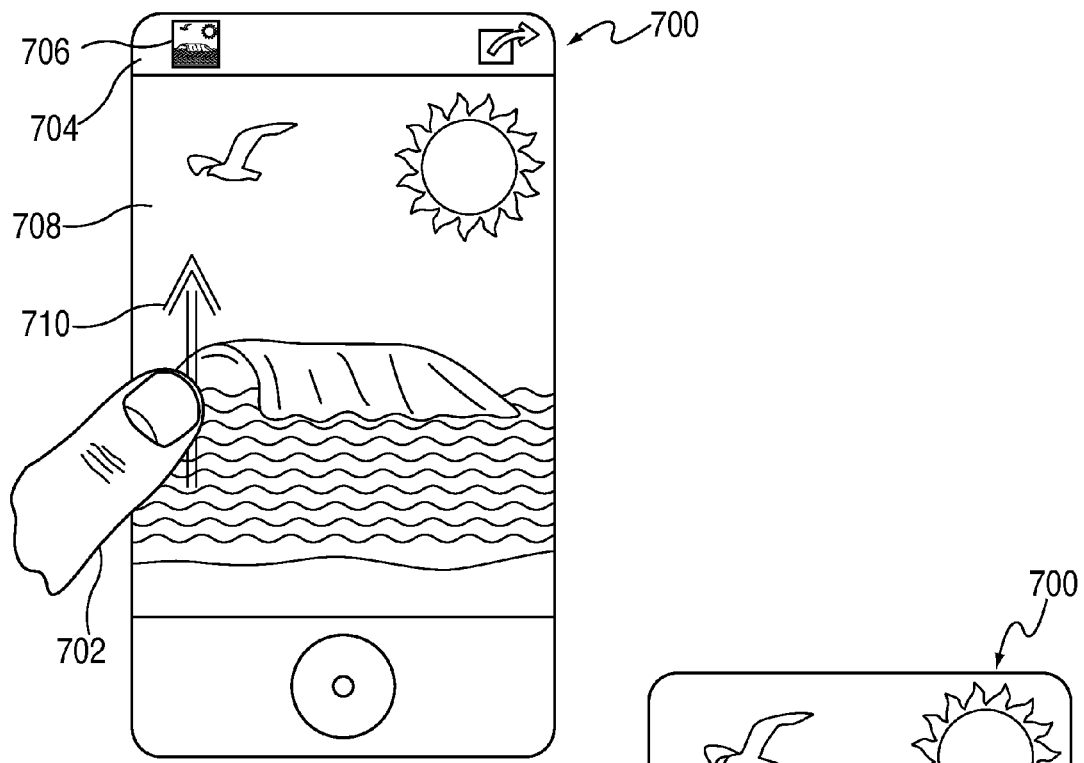
FIGS. 7A and 7B show schematic illustrations of a user interface displaying continuous real-time images and a share bar and having one or more gesture performed on the user interface in accordance with various embodiments.
Figure 7B:
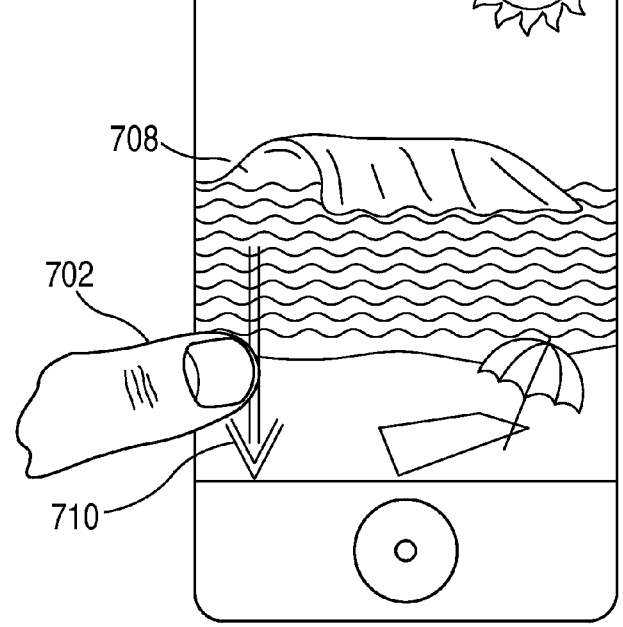

FIGS. 7A and 7B show schematic illustrations of a user interface displaying one or more live (i.e., continuous real-time) images and a share bar, where one or more gestures are performed on the user interface in accordance with various embodiments. User interface 700 may include image 708, which may be displayed on a display interface on a user device (e.g., device 102). In some embodiments, image 708 may be an image captured by an image capturing component on the user device (e.g., camera 138 of FIG. 12). In some embodiments, image 708 may be a series of continuous real-time images obtained by the image capturing component and displayed within user interface 700. For example, image 708 may be the images detected by a camera and/or images captured by the camera, in either a single, multiple, or video image acquisition mode.

In some embodiments, the user may perform one or more gestures that may be detected by the display interface that places the image and/or a thumbnail version of the image in a share bar. For example, the user may swipe finger 702 on the display interface displaying image 708 in the direction of arrow 710. In response to detecting the swipe, image 708 may be placed in share bar 704. Share bar 704 may be substantially similar to share bar 204 of FIG. 2, and the previous description of the latter may apply to the former. In some embodiments, in response to placing the image within the share bar, a corresponding thumbnail may be displayed within the share bar. For example, thumbnail 706 may be displayed within share bar 704 in response to image 708 being placed therein. Thumbnail 706 may be substantially similar to thumbnail 212a of FIG. 2, and the previous description of the latter may apply to the former.

In some embodiments, the user may perform one or more gestures that may delete and/or remove the image. For example, the user may swipe image 708 in the direction of arrow 710 using finger 702 and, in response, image 708 may be deleted and/or removed from display. In some embodiments, image 708 may be a captured image stored locally on the user device and/or externally on an external device, a social media network, or a content management system. In response to swiping finger 702 in the direction of arrow 710, image 708 may be removed and/or deleted from its corresponding storage location. In some embodiments, the removal and/or deletion may be temporary and/or require one or more additional actions to be performed to permanently delete image 708. For example, the user may be required to clear a deletion folder, clear temporary items, or perform any other suitable action to remove an item from their user device.

Figure 8:
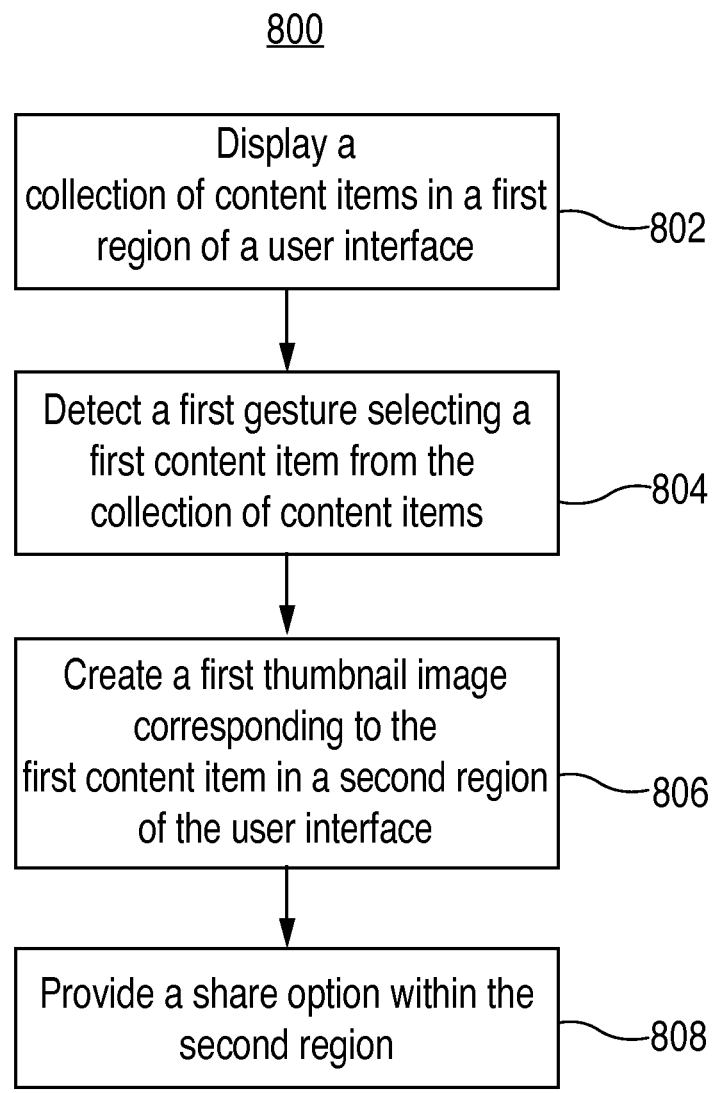
FIG. 8 shows an illustrative flowchart of a process for providing a user interface that allows a user to share content items using a share bar in accordance with various embodiments.

FIG. 8 shows an illustrative flowchart of a process for providing a user interface that allows a user to share content items using a share bar in accordance with various embodiments. Process 800 may begin at step 802. At step 802, a collection of content items may be displayed in a first region of a user interface. For example, content items 202a-f may be displayed within first region 202 of user interface 200 of FIG. 2. User interface 200 may, for example, be displayed on a display interface located on a user device (e.g., user devices 102). First region 202 may include any number of content items and may be positioned at any location on user interface 200. For example, first region 202 may divide the user interface horizontally, vertically, diagonally, or any in any other suitable partition. First region 202 may occupy any amount of user interface 200. For example, first region 202 may occupy a lower half of user interface 200 (e.g., approximately 50% of the corresponding display interface).

At step 804, a first gesture may be detected that selects a first content item or items from the collection of content items. Various types of gestures may include, but are not limited to, swipes, flicks, drags, lassos, taps, hoverings, and/or voice commands. Objects used to perform the various gestures may include, but are not limited to, one or more fingers, a stylus, and/or a computer compatible pen.

At step 806, a first thumbnail corresponding to the selected first content item may be created in a second region of the user interface. In some embodiments, the first thumbnail may be created upon selection of the first content item. For example, as the user selects content item 202a, corresponding thumbnail 212a may be created. In some embodiments, one or more additional gestures may be performed to the selected content item to place it and/or the corresponding thumbnail into the second region of the user interface. In some embodiments, the creation of the first thumbnail may occur in response to the one or more gestures that place the selected first content item in the second region. For example, the user may drag content item 202a into second region 204, and in response to detecting that the content item has entered the second region, thumbnail 212a may be created. In some embodiments, however, the thumbnail for a content item may already exist or have been created on the user device.

In some embodiments, the thumbnail may be a reduced-sized version corresponding to the selected content item. For example, thumbnail 212a may be a reduced-sized version of content item 202a, an exemplary image corresponding to content item 202a, a portion of content item 202a, a pointer directed to content item 202a, a duplicate of content item 202a, or any other type of thumbnail, or any other combination thereof. In some embodiments, a cache memory may be used to store the thumbnail, such as thumbnail 212a. In some embodiments, the thumbnail may be created externally on a content management system while the corresponding content item may be stored locally on the user device.

At step 808, at least one share option may be provided within the second region. The share option may enable the user to share any content items having corresponding thumbnails included within the second region. For example, button 206 may be included within second region 204. The user may select button 206 to share the content items corresponding to thumbnail 212a and/or 212b. In some embodiments, activation of the share button may allow the user to share the corresponding content items with a contact of the user, one or more social media networks, and/or a content management system with which the user has an authorized account. For example, the user may want to share the content items with the user's spouse. In this scenario, the user may select button 206 and share content items 202a and 202b.

In some embodiments, invocation of the share button may cause the generation of a URL link that can be shared with one or more contacts of the user to provide access to or copies of the selected content items. For example, share bar 1204 may include thumbnail images 212a and 212b, corresponding to a collection of content items of the user's family vacation. The user may want to share the collection with one of the user's contacts and/or a social media network with which the user has an account. Invocation of share button 206 may cause the generation of a link that allows anyone with the link to access the collection of content items.

In some embodiments, a second, or even more additional gestures, may be detected by the display interface selecting a second or more additional content items from the collection of content items. In response to detecting the second or more additional gestures, a second or more additional thumbnails corresponding to the selected content item(s) may be placed in the second region.

Figure 9:
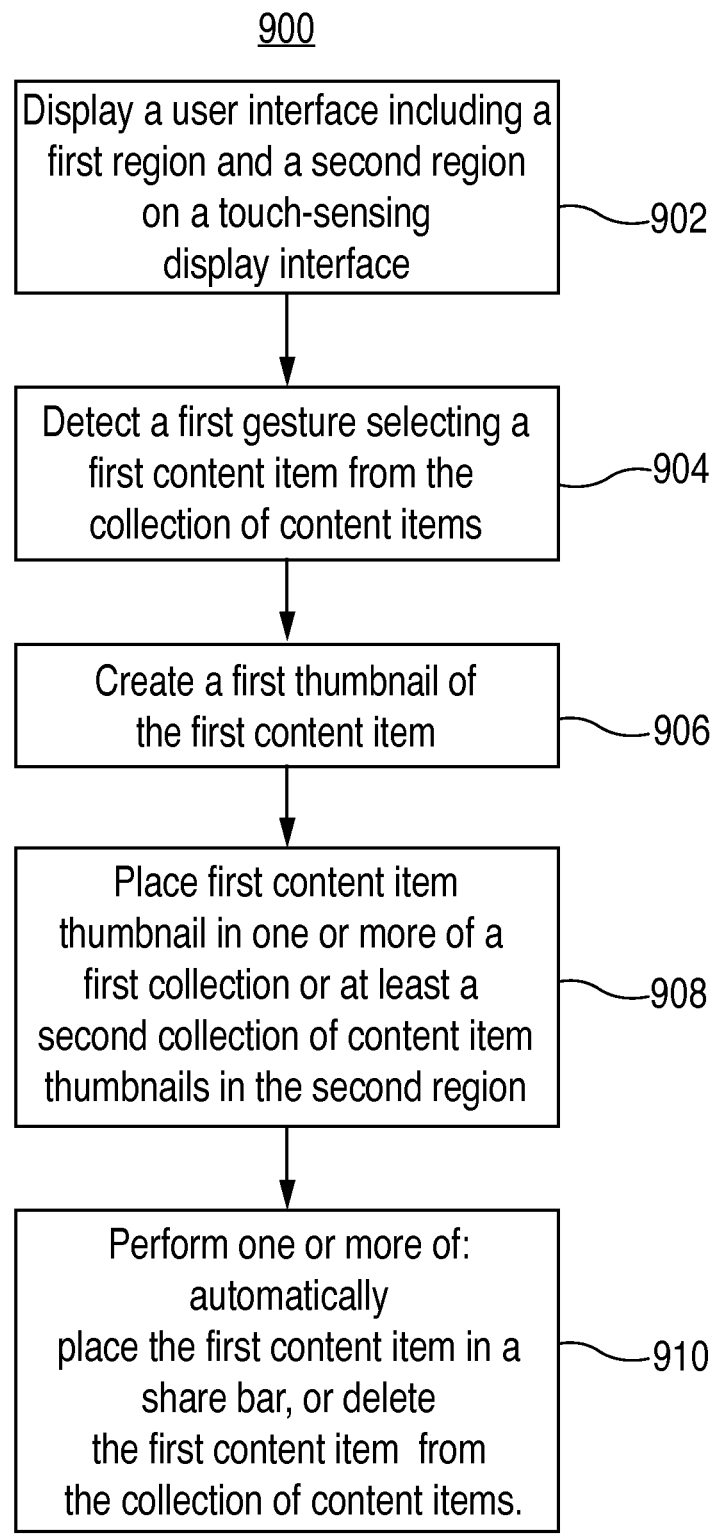
FIG. 9 shows an illustrative flowchart of a process for providing a user interface that allows a user to share content items using multiple share bars in accordance with various embodiments.

FIG. 9 shows an illustrative flowchart of a process used to share collections of content items in accordance with various embodiments. Process 900 may begin at step 902. At step 902, a user interface including a first region and a second region may be displayed on a display interface of a user device. For example, user interface 400 of FIG. 4 of may include first region 402 and second region 420. In some embodiments, the first region may include one or more content items. For example, region 402 may include a collection of content items, such as content items 402a-402f. In some embodiments, the second region may include one or more share bars. For example, second region 420 may include first share bar 404 and second share bar 406. In some embodiments, the second region may include one or more additional share bars. For example, second region 320 of FIG. 3 may include first share region 304, second share region 306, and third share region 308. The first region and the second region may occupy any amount of the user interface and each may be oriented in any suitable fashion. For example, first region and second region may divide the user interface in half horizontally or vertically. In some embodiments, one or more additional regions may be included within the user interface. For example, third region 310 may be displayed on user interface 300, and may occupy any amount of display space within the user interface.

At step 904, a first gesture may be detected with the display interface selecting a first content item from a collection of content items. In some embodiments, the collection of content items may be located within the first region. For example, content items 302a-f may be included within first region 302 of user interface 300 of FIG. 3. In some embodiments, step 904 of FIG. 9 may be substantially similar to step 804, and the previous description of the latter may apply to the former.

At step 906, a first thumbnail corresponding to the first content item may be created. In some embodiments, the creation of the first thumbnail may occur at substantially the same moment as the selection of the first content item by the first gesture. Creation of the first thumbnail may include, for example, creating a duplicate version of the first content item. The duplicate version may be stored in memory on the user device temporarily, such as temporary cache memory, and the duplicate version may be used to create the first thumbnail. In some embodiments, the first thumbnail may be a compressed version of the first content item or a reduced size version of the first content item.

At step 908, the first thumbnail may be placed in a first collection of content item thumbnails or a second collection of content item thumbnails, both of which may be located within the second region of the user interface. In some embodiments, each collection of content item thumbnails may correspond to a share bar. For example, thumbnails 412a, 412b, and 412d may be included within first share bar 404, whereas thumbnails 412c, 412e, and 412f may be included within second share bar 406. Although only two share bars (including two collections of content item thumbnails) have been described, persons skilled in the art will recognize that in various embodiments any number of collections may be included. For example, collections 330, 332, and 334 may be included within first share bar 304, second share bar 306, and third share bar 308, respectively.

At step 910, one or more share options may be provided within the second region that may enable the user to share any of the collections of content item thumbnails (and thus the actual underlying image corresponding thereto) included therein. In some embodiments, each share bar may include individual share options, such as a share button. For example, first share bar 304 may include first share button 314, second share bar 306 may include second share button 318, and third share bar 308 may include third share button 318. In some embodiments, the second region may include one or more share bars (e.g., first share bar 304 and second share bar 306), but may only include a single share button. In this scenario, activation of the share button may then include an option for the user to select one or more of the share bars to share with one or more contacts of the user, one or more social media networks, and/or a content management system. In some embodiments, step 910 of FIG. 9 may be substantially similar to step 808 of FIG. 8, and the same description may apply.

In some embodiments, a second gesture may be detected with the display interface that selects a second content item from the collection of content items. In some embodiments, after the second content item has been selected, a second content item thumbnail corresponding to the second content item may be created. The second content item thumbnail may then be placed in either the first collection of content item thumbnails or the second collection of content item thumbnails. For example, a second gesture may select content item 302b and create corresponding thumbnail 312b. Thumbnail 312b may be placed first share bar 304 where thumbnail 312a, which may correspond to the content item 302a selected using the first gesture, may have been placed. Both thumbnails need not be placed in the collection of content items however. For example, the second gesture may select content item 302c and create corresponding thumbnail 312c. Thumbnail 312c may be placed in second share bar 306, for example, while thumbnail 312a may reside within the first share bar.

In some embodiments, the collection of content item thumbnails may be scrollable. For example, collection of content item thumbnails 330 of first share bar 304 may be scrolled through via any suitable gesture. The user may swipe in the direction of arrow 340, for example, to scroll through collection 330.

In some embodiments, placement of a thumbnail in a collection of content item thumbnails may automatically upload a duplicate version of the corresponding content item to a content management system. The user may have an authorized account on the content management system, and the content item may be uploaded to the user's account. In some embodiments, the collection may correspond to a collection of content items on the content management system within the user's account, and the placement of the thumbnail within the collection of content item thumbnails in the share bar may cause a duplicate version of the content item to be uploaded to the content management system at a root level. The placement may further create pointers on the content management system that may point the user to the duplicate version of the content item located at the root level.

In some embodiments, a second gesture may be detected with the display interface. The second gesture may enable the user to remove the first content item thumbnail from the first collection of content item thumbnails located in the first share bar or the second collection of content item thumbnails located in the second share bar. For example, the user may perform a flick gesture on thumbnail 312a. The flick may remove thumbnail 312a, and therefore corresponding content item 302a, from first collection 330 located in the first share bar. The second gesture may additionally, or alternatively, delete a second content item from the collection of content items. For example, the user may perform a flick gesture on thumbnail 312a. The flick may, in response, delete corresponding content item 302a from collection of content items 302a-f.

In some embodiments, a second gesture may be detected with the display interface that may move a thumbnail from the first share bar to the second share bar. For example, content item 312a may be moved via the second gesture from first share bar 304 to second share bar 306. In some embodiments, the content item may be moved from the second share bar to the first share bar, and/or between any other share bars. In some embodiments, movements from one share bar to another share bar may automatically be synchronized with a content management system with which the user performing the gesture(s) has an authorized account. In some embodiments, the movement of a thumbnail between various share bars may cause a pointer, which points to the corresponding content item, to point to a different collection of content items.

Figure 10:
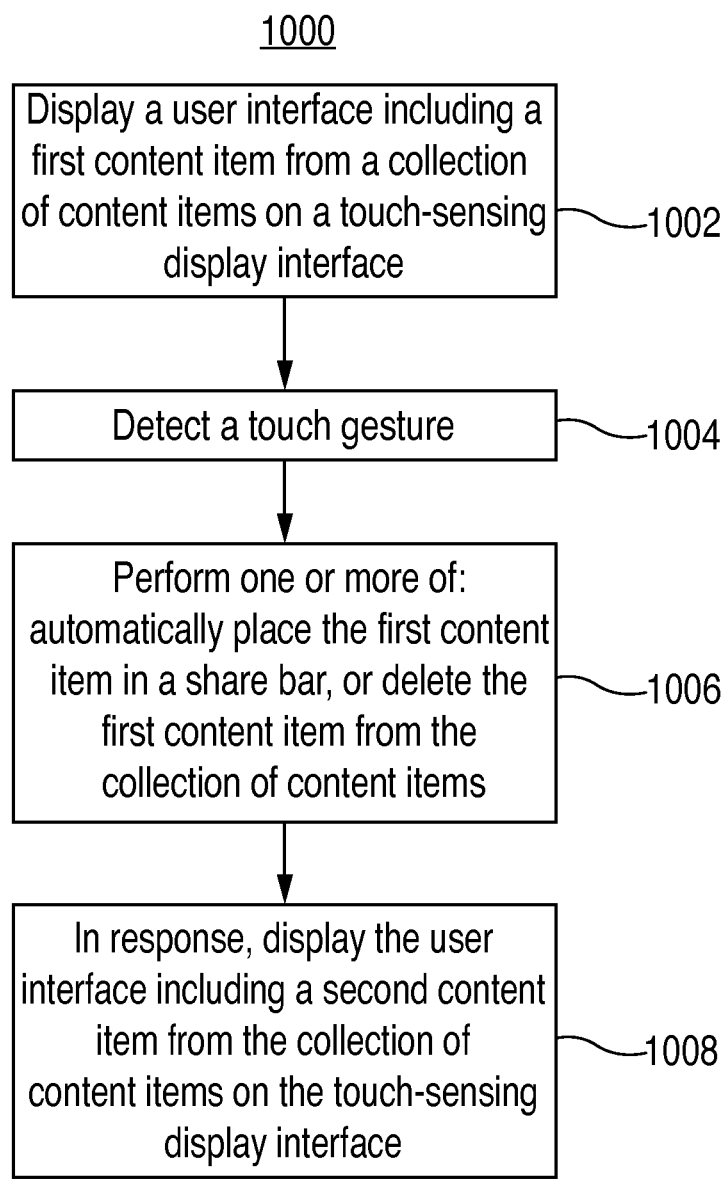
FIG. 10 shows an illustrative flowchart of a process for forming a share bar or deleting a content item from within a user interface in response to detecting a gesture in accordance with various embodiments.

FIG. 10 shows an illustrative flowchart for forming a share bar displayed on a user interface in accordance with various embodiments. Process 1000 may begin at step 1002. At step 1002, a first content item from a collection of content items may be displayed on a display interface of a user device. In some embodiments, the collection of content items may be located within memory on the user device. For example, the collection of content items may correspond to a photo album stored within memory of device 102. In some embodiments, the collection of content items may be displayed, at least in part, on the display interface. However, the collection of content items may also be "hidden" and the user may be capable of seeing each content item included within the collection using any suitable means. For example, a user may flick to the right or left of display interface, and in response, the previous or latter photograph within the photo album may be displayed.

At step 1004, a touch gesture may be detected by the display interface. Any object capable of interfacing with the display interface may perform the touch gesture. In some embodiments, step 1004 may be substantially similar to step 904 of FIG. 9, with the exception that one or more content items may be selected. However, the touch gesture may, in some embodiments, select one or more content items from a collection of content items.

At step 1006, the first content item may be placed in a share bar and/or the first content item may be deleted from the collection of content items in response to the gesture being detected. For example, a user may flick content item 708 in the direction of arrow 710 of FIG. 7A. In response to the flick being detected, content item 708 may be placed within share bar 704. In some embodiments, a thumbnail of the content item may be placed within the share bar. For example, thumbnail 706 may be placed within share bar 704 in response to content item 708 being flicked in the direction of arrow 710. As another example, the user may flick image 708 in the direction of arrow 710 of FIG. 7B, which may delete content item 1708 from the collection of content items.

At step 1008, a second content item from the collection of content items may be displayed on the display interface in response to either the placement of the first content item within the share bar or deletion of the first content item. For example, the following content item from the collection may be displayed on the display interface in response to the gesture being detected. In some embodiments, a random content item from the collection of content items may be displayed on the display interface in response to the action being performed on the first content item.

In some embodiments, the first content item (and the second content item) may be displayed on the display interface in a full screen mode. For example, the content item may occupy the entire display region of the display interface on the user device. In some embodiments, as the gesture is performed on the first content item, the second content item may begin to be displayed. For example, as the first content item moves towards the share bar, a lower portion of the display interface may begin to display an upper portion of the second content item. This may provide a smooth and fluid transition between succeeding content items.

Figure 11:
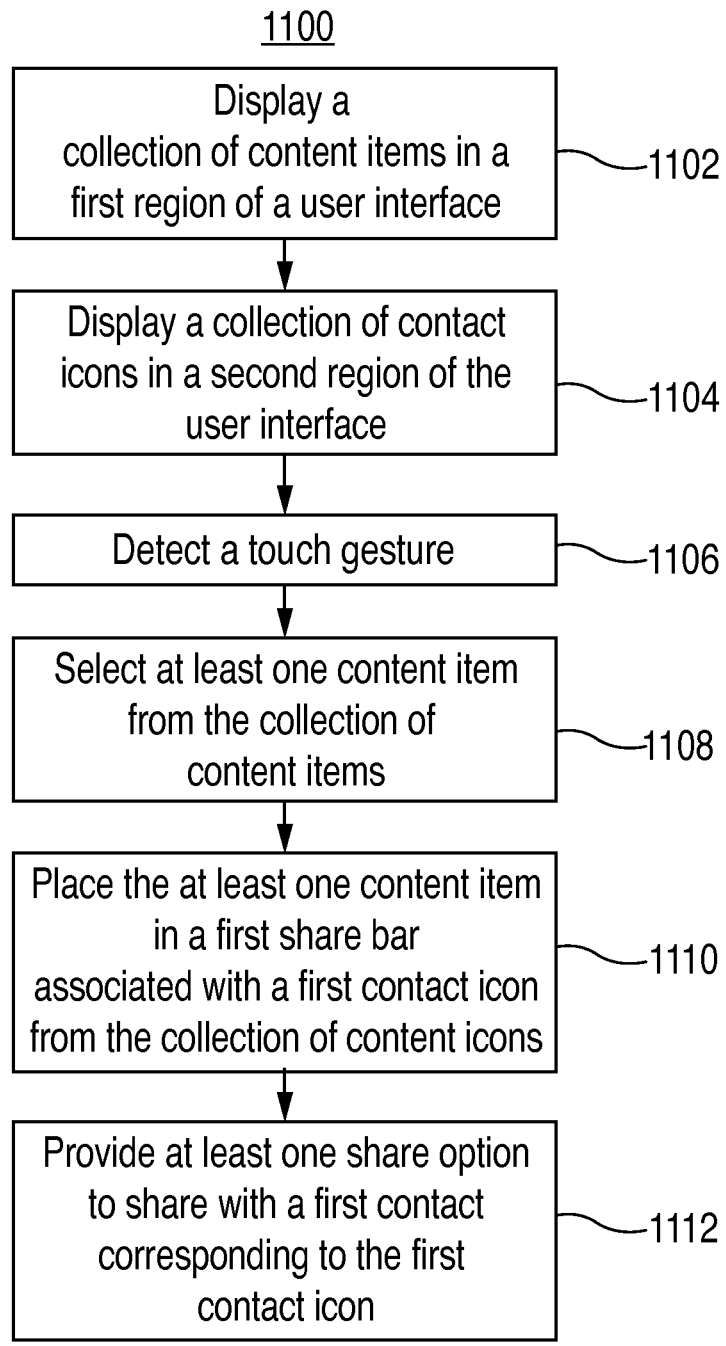
FIG. 11 shows an illustrative flowchart of a process for providing a user interface including a share bar corresponding to a user's contact in accordance with various embodiments.

FIG. 11 shows an illustrative flowchart of a process for sharing content items with a user's contacts in accordance with various embodiments. Process 1100 may begin at step 1102. At step 1102, a collection of content items may be displayed in a first region of a user interface on a display interface. For example, first region 402 of user interface 400 of FIG. 4 may include content items 402a-f. In some embodiments, step 1102 of FIG. 11 may be substantially similar to step 802 of FIG. 8, and the previous description may apply here.

At step 1104, a collection of contact icons may be displayed within a second region of the user interface on the display interface. In some embodiments, a first contact icon may be displayed within a first share bar and a second contact icon may be displayed within a second share bar. The first contact icon may correspond to a first contact of a user whereas the second contact icon may correspond to a second contact of the user. In some embodiments, one or more contacts may have contact icons included within the share bar. For example, first share bar 404 may include first contact icon 404a corresponding to a first contact of the user and second share bar 406 may include second contact icon 406b correspond to a second contact of the user. The first contact's name may also be included within first share bar 404, for example, contact name 404b and the second contact's name may be included within second share bar 406. In some embodiments, multiple contact icons may be included within a single share bar, which may correspond to multiple contacts of the user. For example, share bar 506 may be a share bar for the user's family. Contact icons corresponding to the user's family members may be included within share bar 506.

At step 1106, a touch gesture may be detected with the display interface. For example, a flick, swipe, tap, lasso, drag, hover, or audio command, or any other gesture, or any combination thereof, may be detected with the display interface. In some embodiments, step 1106 of FIG. 11 may be substantially similar to step 1004 of FIG. 10, and the previous description may apply here.

At step 1108, one or more content items may be selected from the collection of content items in response to detecting the gesture. For example, content item 402a may be selected from collection of content items 402a-f. In some embodiments, step 1106 and step 1108 may be performed at substantially the same time. For example, the gesture may select the content item from the collection of content items. In some embodiments, step 1108 may be substantially similar to step 804 of FIG. 8, and the previous description may apply here.

At step 1110, the one or more selected content items may be placed in a first share group associated with a first contact icon from the collection of content items. For example, content item 402a of FIG. 4 may be placed within first share bar 404 corresponding to a first contact of the user. Any amount of content items may be placed within a share bar, and the previous description may be repeated for multiple content items included within the collection of content items. In some embodiments, steps 1108 and 1110 or steps 1106-1110 may be performed at substantially the same time.

At step 1112, one or more share options enabling the user to share the content items included within a share bar may be provided. For example, share button 516 may be included within share bar 506. Any content items placed within share bar 506 may be shared with the contacts corresponding to content items 506a if/when the user invokes share button 516. In some embodiments, step 1112 of FIG. 11 may be substantially similar to step 802 of FIG. 8, and the previous description may apply.

Figure 12:
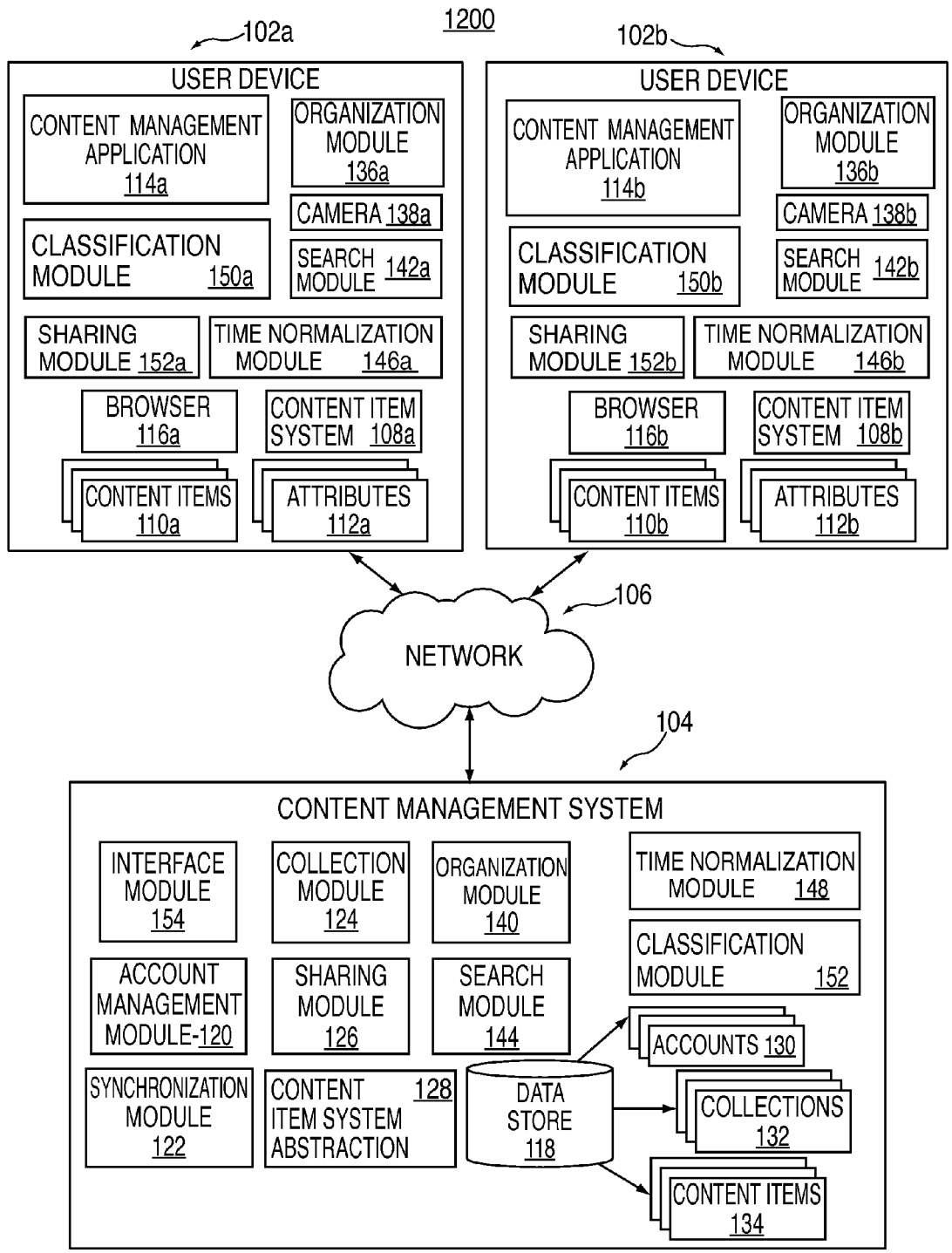
FIG. 12 shows another exemplary system in accordance with various embodiments.

FIG. 12 shows an exemplary system in accordance with various embodiments. In some embodiments, system 1200 of FIG. 12 may be substantially similar to system 100 of FIG. 1, with the exception that the former may present elements of system 100 at a more granular level (e.g., modules, applications, etc.).

In some embodiments, user devices 102 may be used to create, access, modify, and manage content items, such as content items 110a and 110b (collectively 110), stored locally within content item system 108a and 108b (collectively systems 108) on user device 102 and/or stored remotely on content management system 104 (e.g., within data store 118). For example, user device 102a may access content items 110b stored remotely with data store 118 of content management system 104 and may, or may not, store content item 110b locally within content item system 108a on user device 102a. Continuing with the example, user device 102a may temporarily store content item 110b within a cache locally on user device 102a, make revisions to content item 110b, and the revisions to content item 110b may be communicated and stored in data store 118 of content management system 104. Optionally, a local copy of content item 110a may be stored on user device 102a. In some embodiments, data store 118 may include one or more collections 132 of content items. For example, collections 132 may include one or more content items having similar properties (e.g., metadata) and/or including similar content.

In some embodiments, user devices 102 may include camera 138 (e.g., 138a and 138b) to capture and record digital images and/or videos. User devices 102 may capture, record, and/or store content items, such as images, using camera 138. For example, camera 138 may capture and record images and store metadata with the images. Metadata may include, but is not limited to, the following: creation time timestamp, geolocation, orientation, rotation, title, and/or any other attributes or data relevant to the captured image. Metadata values may be stored as attribute 112 name-value pairs, tag-value pairs, and/or any other method, or any combination thereof, to associate the metadata with the content item and easily identify the type of metadata. In some embodiments, attributes 112 may be tag-value pairs defined by a particular standard, including, but not limited to, Exchangeable Image File Format ("Exif"), JPEG File Interchange Format (Jfif), and/or any other standard.

In some embodiments, user devices 102 may include time normalization module 146, and content management system 104 may include time normalization module 148. Time normalization module 146 (e.g., 146a and 146b) may be used to normalize dates and times stored with a content item. Time normalization module 146, counterpart time normalization module 148, and/or any combination thereof, may be used to normalize dates and times stored for content items. The normalized times and dates may be used to sort, group, perform comparisons, perform basic math, and/or cluster content items.

In some embodiments, user devices 102 may include organization module 136, and content management system 104 may include organization module 140. Organization module 136 (e.g., 136a and 136b) may be used to organize content items into clusters or collections of content items, organize content items to provide samplings of content items for display within user interfaces, and/or retrieve organized content items for presentation. Organization module 136 may utilize any clustering algorithm. Organization module 136 may be used to identify similar content items for clusters in order to organize content items for presentation within user interfaces on user devices 102 and content management system 104. Similarity rules may be defined to create one or more numeric representations embodying information on similarities between each of the content items in accordance with various similarity rules. Organization module 136 may use numeric representations as a reference for similarity between content items in order to cluster the content items.

In some embodiments, content items may be organized into clusters to aid with retrieval of similar content items in response to search requests. For example, organization module 136a may identify that two images are similar and may group the images together in a cluster. Organization module 136a may process content items to determine clusters independently and/or in conjunction with counterpart organization module (e.g., 140 and/or 136b). In other embodiments, organization module 136a may only provide clusters identified with counterpart organization modules (e.g., 140 and/ or 136*b*) for presentation. Continuing with this example, processing of content items to determine clusters may be an iterative process that may be executed upon receipt of new content items and/or new similarity rules.

In some embodiments, user device 102*a* may include classification module 150*a*, while user device 102*b* may include classification module 150*b* (collectively 150), which may be used independently, in combination with classification module 152 include on content management system 104, and/or any combination thereof to classify content items, rectify content items, and/or classify images. For example, the classification modules 150 and/or 152 may be used to determine if an image includes a document, and if there so, determine a type of document stored therein. Content item rectification may be performed to correct, perform further transformations, and/or crop content items to improve the display of the content items (e.g., correct the display of a document within an image).

In some embodiments, user device 102*a* may include search module 142*a*, while user device 102*b* may include search module 142*b*, which collectively may be referred to as search modules 142. Content management system 104 may also be provided with counterpart search module 144. Each of search modules 142 and 144 may be capable of supporting searches for content items located on both user devices 102 and/or content management system 104. A search request may be received by search module 142 and/or 144 that requests one or more content items. In some embodiments, the search may be handled by searching metadata and/or attributes assigned to content items during the provision of management services. For example, cluster markers stored with content items may be used to find content items by date. In this particular scenario, cluster markers may indicate an approximate time, or average time, for the content items stored with the cluster marker, and the marker may be used to speed the search and/or return the search results with the contents of the cluster with particular cluster markers.

Content items 110 managed by content management system 104 may be stored locally within content item system 108 of respective user devices 102 and/or stored remotely within data store 118 of content management system 104 (e.g., content items 134 in data store 118). Content management system 104 may provide synchronization of content items managed thereon. Attributes 112*a* and 112*b* (collectively 112) or other metadata may also be stored with content items 110. For example, a particular attribute may be stored with a content item to track content items locally stored on user devices 102 that are managed and/or synchronized by content management system 104. In some embodiments, attributes 112 may be implemented using extended attributes, resource forks, or any other implementation that allows for storing metadata with a content item that is not interpreted by a content item system, such as content item system 108. In particular, attributes 112*a* and 112*b* may be content identifiers for content items. For example, the content identifier may be a unique or nearly unique identifier (e.g., number or string) that identifies the content item. By storing a content identifier with the content item, the content item may be tracked. For example, if a user moves the content item to another location within content item system 108 hierarchy and/or modifies the content item, then the content item may still be identified within content item system 108 of user device 102. Any changes or modifications to the content item identified with the content identifier may be uploaded or provided for synchronization and/or version control services provided by content management system 104.

A stand-alone content management application 114*a* and 114*b* (collectively 114), client application, and/or third-party application may be implemented on user devices 102*a* and 102*b*, respectively, to provide a user interface to a user for interacting with content management system 104. Content management application 114 may expose the functionality provided with content management interface module 154 and accessible modules for user device 102. Web browser 116*a* and 116*b* (collectively 116) may be used to display a web page front end for a client application that may provide content management 104 functionality exposed/provided with content management interface module 154.

Content management system 104 may allow a user with an authenticated account to store content, as well as perform management tasks, such as retrieve, modify, browse, synchronize, and/or share content with other accounts. Various embodiments of content management system 104 may have elements including, but not limited to, content management interface module 154, account management module 120, synchronization module 122, collections module 124, sharing module 126, file system abstraction 128, data store 118, and organization module 140. Content management interface module 154 may expose the server-side or back end functionality/capabilities of content management system 104. For example, a counter-part user interface (e.g., stand-alone application, client application, etc.) on user devices 102 may be implemented using content management interface module 154 to allow a user to perform functions offered by modules of content management system 104.

The user interface displayed on user device 102 may be used to create an account for a user and/or authenticate the user to use the account using account management module 120. Account management module 120 may provide the functionality for authenticating use of an account by a user and/or user device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., content item edit history), maximum storage space authorized, storage space used, content storage locations, security settings, personal configuration settings, content sharing data, etc. An amount of storage space on content management system 104 may be reserved, allotted, allocated, stored, and/or may be accessed with an authenticated account. The account may be used to access content items 134 and/or content items 110 within data store 118 for the account, and/or content items 134 and/or content items 110 made accessible to the account that are shared from another account. In some embodiments, account management module 120 may interact with any number of other modules of content management system 104.

An account on content management system 104 may, in some embodiments, be used to store content such as documents, text items, audio items, video items, etc., from one or more user devices 102 authorized by the account. The content may also include collections of various types of content with different behaviors, or other mechanisms of grouping content items together. For example, an account may include a public collection that may be accessible to any user. In some embodiments, the public collection may be assigned a web-accessible address. A link to the web-accessible address may be used to access the contents of the public folder. In another example, an account may include a photos collection that may store photos and/or videos, and may provide specific attributes and actions tailored for photos and/or videos. The account may also include an audio collection that provides the ability to play back audio items and perform other audio related actions. The account may still further include a special purpose collection. An account may also include shared collections or group collections that may be linked with and available to multiple user accounts. In some embodiments, access to a shared collection may differ for different users that may be capable of accessing the shared collection.

Content items 110 and/or content items 134 may be stored in data store 118. Data store 118 may, in some embodiments, be a storage device, multiple storage devices, or a server. Alternatively, data store 118 may be cloud storage provider or network storage accessible via one or more communications networks. Content management system 104 may hide the complexity and details from user devices 102 by using content item system abstraction 128 (e.g., a content item system database abstraction layer) so that user devices 102 do not need to know exactly where the content items are being stored by content management system 104. Embodiments may store the content items in the same collections hierarchy as they appear on user device 102. Alternatively, content management system 104 may store the content items in various orders, arrangements, and/or hierarchies. Content management system 140 may store the content items in a network accessible storage (SAN) device, in a redundant array of inexpensive disks (RAID), etc. Content management system 104 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a content item system, or any other collection of data. In some embodiments, each content item stored in data store 118 may be assigned a system-wide unique identifier.

Data store 118 may, in some embodiments, decrease the amount of storage space required by identifying duplicate content items or duplicate chunks of content items. Instead of storing multiple copies, data store 118 may store a single copy of content item 134 and then use a pointer or other mechanism to link the duplicates to the single copy. Similarly, data store 118 may store content items 134 more efficiently, as well as provide the ability to undo operations, by using a content item version control that tracks changes to content items, different versions of content items (including diverging version trees), and a change history. The change history may include a set of changes that, when applied to the original content item version, produce the changed content item version.

Content management system 104 may be configured to support automatic synchronization of content from one or more user devices 102. The synchronization may be platform independent. That is, the content may be synchronized across multiple user devices 102 of varying type, capabilities, operating systems, etc. For example, user device 102*a* may include client software, which synchronizes, via synchronization module 122 at content management system 104, content in content item system 108 of user devices 102 with the content in an associated user account. In some cases, the client software may synchronize any changes to content in a designated collection and its sub-collection, such as new, deleted, modified, copied, or moved content items or folders. In one example of client software that integrates with an existing content management application, a user may manipulate content directly in a local folder, while a background process monitors the local content item for changes and synchronizes those changes to content management system 104. In some embodiments, a background process may identify content that has been updated at content management system 104 and synchronize those changes to the local collection. The client software may provide notifications of synchronization operations, and may provide indications of content statuses directly within the content management application. In some embodiments, user device 102 may not have a network connection available. In this scenario, the client software may monitor the linked collection for content item changes and queue those changes for later synchronization to content management system 104 when a network connection is available. Similarly, a user may manually stop or pause synchronization with content management system 104.

A user may also view or manipulate content via a web interface generated and served by content management interface module 154. For example, the user may navigate in a web browser to a web address provided by content management system 104. Changes or updates to content in data store 118 made through the web interface, such as uploading a new version of a content item, may be propagated back to other user devices 102 associated with the user's account. For example, multiple user devices 102, each with their own client software, may be associated with a single account, and content items in the account may be synchronized between each of user devices 102.

Content management system 104 may include sharing module 126 for managing sharing content and/or collections of content publicly or privately. Sharing module 126 may manage sharing independently or in conjunction with counterpart sharing module 152*a*, located on user device 102*a*, and sharing module 152*b* located on user device 102*b* (collectively sharing modules 152). Sharing content publicly may include making the content item and/or the collection accessible from any device in network communication with content management system 104. Sharing content privately may include linking a content item and/or a collection in data store 118 with two or more user accounts so that each user account has access to the content item. The sharing may be performed in a platform independent manner. That is, the content may be shared across multiple user devices 102 of varying type, capabilities, operating systems, etc. For example, one or more share links may be provided to a user, or a contact of a user, to access a shared content item. The content may also be shared across varying types of user accounts. In particular, the sharing module 126 may be used with collections module 124 to allow sharing of a virtual collection with another user or user account. A virtual collection may be a collection of content identifiers that may be stored in various locations within content item systems 108 of user device 102 and/or stored remotely at content management system 104.

In some embodiments, the virtual collection for an account with a content management system may correspond to a collection of one or more identifiers for content items (e.g., identifying content items in storage). The virtual collection is created with collections module 124 by selecting from existing content items stored and/or managed by content management system and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item to a directory) the content item in another location within data storage in order to place the content item in the collection.

In some embodiments, content management system 104 may be configured to maintain a content directory or a database table/entity for content items where each entry or row identifies the location of each content item in data store 118. In some embodiments, a unique or a nearly unique content identifier may be stored for each content item stored in data store 118.

In some embodiments, metadata may be stored for each content item. For example, metadata may include a content path that may be used to identify the content item. The content path may include the name of the content item and a content item hierarchy associated with the content item (e.g., the path for storage locally within a user device 102). Content management system 104 may use the content path to present the content items in the appropriate content item hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator ("URL"), which allows any web browser to access the content in content management system 104 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be sent to content management system 104 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be sent to content management system 104 which may use the received content identification data to identify the appropriate content entry or database row and return the content item associated with the content entry or database row.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or "false" to indicate that a URL to the content item has not been created. Sharing module 126 may be configured to change the value of the flag to 1 or "true" after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This may allow a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Exemplary Systems

In exemplary embodiments of the present invention, any suitable programming language may be used to implement the routines of particular embodiments including C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time Particular embodiments may be implemented in a computer-readable storage device or non-transitory computer readable medium for use by or in connection with the instruction execution system, apparatus, system, or device. Particular embodiments may be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for forming share bars including collections of content items, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed:

1. A method, comprising:
    displaying, on a display interface of a user device, a first content item from a collection of content items in full screen mode;
    detecting a first touch gesture with respect to the first content item;
    if a direction of the first touch gesture is in a first direction, in response to the first touch gesture:
        displaying a share bar overlapping a portion of the first content item; and
        adding a thumbnail of the first content item to the share bar without modifying the first content item;
    if the direction of the first touch gesture is in a second direction opposite the first direction, in response to the first touch gesture:
        removing the first content item from the collection of content items without modifying the first content item; and
        replacing the first content item with a second content item displayed in full screen mode; and
    providing a share option within the share bar by generating a link that enables the user to share content items having corresponding thumbnails within the share bar with at least one contact of the user.

2. The method of claim 1, further comprising creating the thumbnail of the first content item in response to the first touch gesture.

3. The method of claim 1, wherein the collection of content items comprises a collection of one or more of photographs or videos.

4. The method of claim 1, wherein the first touch gesture comprises one or more of a swipe, a flick, a drag, or a finger roll.

5. The method of claim 1, further comprising:
    detecting a second touch gesture with respect to the second content item; and
    adding, in response to the second touch gesture, a thumbnail of the second content item to the share bar without modifying the second content item.

6. The method of claim 5, further comprising creating the thumbnail of the second content item in response to the second touch gesture.

7. The method of claim 1, further comprising receiving, from a user, a selection of the collection of content items from a listing of collections of content items stored on one or more of:
    the user device;
    a social media network application; or
    an authorized account on a content management system.

8. The method of claim 1, wherein selection of the share option shares any content items having corresponding thumbnails in the share bar by generating one or more of: a URL link, an instant message, an SMS message, a social media network message, or an email.

9. The method of claim 1, further comprising uploading a duplicate version of the first content item to a content management system.

10. The method of claim 1, wherein the thumbnail of the first content item in the share bar comprises a first pointer to the first content item on a content management system.

11. The method of claim 10, wherein:
    the first pointer points to a duplicate version of the first content item; and
    the duplicate version of the first content item is located at a root level of a user account on the content management system corresponding to a user.

12. A non-transitory computer readable storage medium including a set of instructions that, when executed by at least one processor, cause a computing device to:
    display, on a display interface of a user device, a first content item from a collection of content items in full screen mode;
    detect a first touch gesture with respect to the first content item;
    if a direction of the first touch gesture is in a first direction, in response to the first touch gesture:
        display a share bar overlapping a portion of the first content item; and
        add a thumbnail of the first content item to the share bar without modifying the first content item;
    if the direction of the first touch gesture is in a second direction opposite the first direction, in response to the first touch gesture:
        remove the first content item from the collection of content items without modifying the first content item; and
        replace the first content item with a second content item displayed in full screen mode; and
    provide a share option within the share bar by generating a link that enables the user to share content items having corresponding thumbnails within the share bar with at least one contact of the user.

13. The non-transitory computer readable storage medium of claim 12, further comprising instructions that, when executed by the at least one processor, cause the computing device to provide a share option within the share bar, wherein the share option enables a user to share the first content item.

14. The non-transitory computer readable storage medium of claim 12, wherein the thumbnail of the first content item in the share bar comprises a first pointer to the first content item on a content management system.

15. The non-transitory computer readable storage medium of claim 14, wherein:
the first pointer points to a duplicate version of the first content item; and
the duplicate version of the first content item is located at a root level of a user account on the content management system corresponding to the user.

16. The non-transitory computer readable storage medium of claim 12, further comprising instructions that, when executed by the at least one processor, cause the computing device to create the thumbnail of the first content item in response to the first touch gesture.

17. The non-transitory computer readable storage medium of claim 12, further comprising instructions that, when executed by the at least one processor, cause the computing device to:
detecting a second touch gesture with respect to the second content item; and
adding, in response to the second touch gesture, a thumbnail of the second content item to the share bar without modifying the second content item.

18. A user device, comprising:
a display screen;
at least one processor; and
at least one non-transitory computer readable storage medium including a set of instructions that, when executed by the at least one processor, cause the user device to:
display, on a display interface on the display screen, a first content item from a collection of content items in full screen mode;
detect a first touch gesture with respect to the first content item;
if a direction of the first touch gesture is in a first direction, in response to the first touch gesture:
display a share bar overlapping a portion of the first content item; and
add a thumbnail of the first content item to the share bar without modifying the first content item;
if the direction of the first touch gesture is in a second direction opposite the first direction, in response to the first touch gesture:
remove the first content item from the collection of content items without modifying the first content item; and
replace the first content item with a second content item displayed in full screen mode; and
provide a share option within the share bar by generating a link that enables the user to share content items having corresponding thumbnails within the share bar with at least one contact of the user.

* * * * *